US010560760B2

(12) United States Patent
Murray

(10) Patent No.: US 10,560,760 B2
(45) Date of Patent: Feb. 11, 2020

(54) METHODS AND SYSTEMS FOR MULTIMEDIA CONTENT

(71) Applicant: ZED CREATIVE INC., Halifax (CA)

(72) Inventor: Andrew Murray, Montreal (CA)

(73) Assignee: Zed Creative Inc., Halifax, Nova Scotia (CA)

(*) Notice: Subject to any disclaimer, the term of this patent is extended or adjusted under 35 U.S.C. 154(b) by 0 days.

(21) Appl. No.: 15/510,298

(22) PCT Filed: Oct. 27, 2015

(86) PCT No.: PCT/CA2015/051092
§ 371 (c)(1),
(2) Date: Mar. 10, 2017

(87) PCT Pub. No.: WO2016/065468
PCT Pub. Date: May 6, 2016

(65) Prior Publication Data
US 2017/0295414 A1  Oct. 12, 2017

Related U.S. Application Data

(60) Provisional application No. 62/068,867, filed on Oct. 27, 2014.

(51) Int. Cl.
*H04N 21/858* (2011.01)
*H04N 21/4725* (2011.01)
*H04N 21/854* (2011.01)

(52) U.S. Cl.
CPC ..... *H04N 21/8583* (2013.01); *H04N 21/4725* (2013.01); *H04N 21/858* (2013.01); *H04N 21/85406* (2013.01)

(58) Field of Classification Search
CPC .............. H04N 21/4725; H04N 21/8583
USPC ................................ 725/32–34, 51
See application file for complete search history.

(56) References Cited

U.S. PATENT DOCUMENTS

| 2001/0001160 A1* | 5/2001 | Shoff | H04N 5/44543 |
| | | | 725/51 |
| 2004/0003400 A1* | 1/2004 | Carney | G06Q 30/02 |
| | | | 725/42 |
| 2006/0187358 A1* | 8/2006 | Lienhart | G06F 17/30802 |
| | | | 348/661 |

(Continued)

Primary Examiner — Brian T Pendleton
Assistant Examiner — Alan H Luong
(74) Attorney, Agent, or Firm — Rosenberg, Klein & Lee

(57) ABSTRACT

Despite the massive advances in digital electronics, telecommunications networks, and electronic devices in the past 20 years our engagement with video content is essentially unchanged to that of the first video recorders as it is merely where we access it and upon what we access it that have changed. It is still a passive experience. Accordingly, it would be beneficial to provide multimedia content that facilitates user engagement and transactions directly through their viewing of the multimedia content in shareable multimedia content elements. Such engagement and transactions may be accessing additional informational content linked to specific elements within the multimedia content or triggering the purchase of an item contained within the multimedia content.
Embodiments of the invention may support monetization, analytics, secondary multimedia content, website functionality and micro-websites.

23 Claims, 22 Drawing Sheets

(56) References Cited

U.S. PATENT DOCUMENTS

| | | | |
|---|---|---|---|
| 2007/0079321 A1* | 4/2007 | Ott | H04H 60/73 |
| | | | 725/18 |
| 2008/0052742 A1* | 2/2008 | Kopf | H04N 5/44591 |
| | | | 725/34 |
| 2012/0167146 A1* | 6/2012 | Incorvia | H04N 21/234318 |
| | | | 725/60 |
| 2013/0031582 A1* | 1/2013 | Tinsman | H04N 21/2353 |
| | | | 725/36 |
| 2013/0152135 A1* | 6/2013 | Hong | H04N 21/4622 |
| | | | 725/51 |
| 2015/0296250 A1* | 10/2015 | Casper | H04N 21/4316 |
| | | | 725/34 |

* cited by examiner

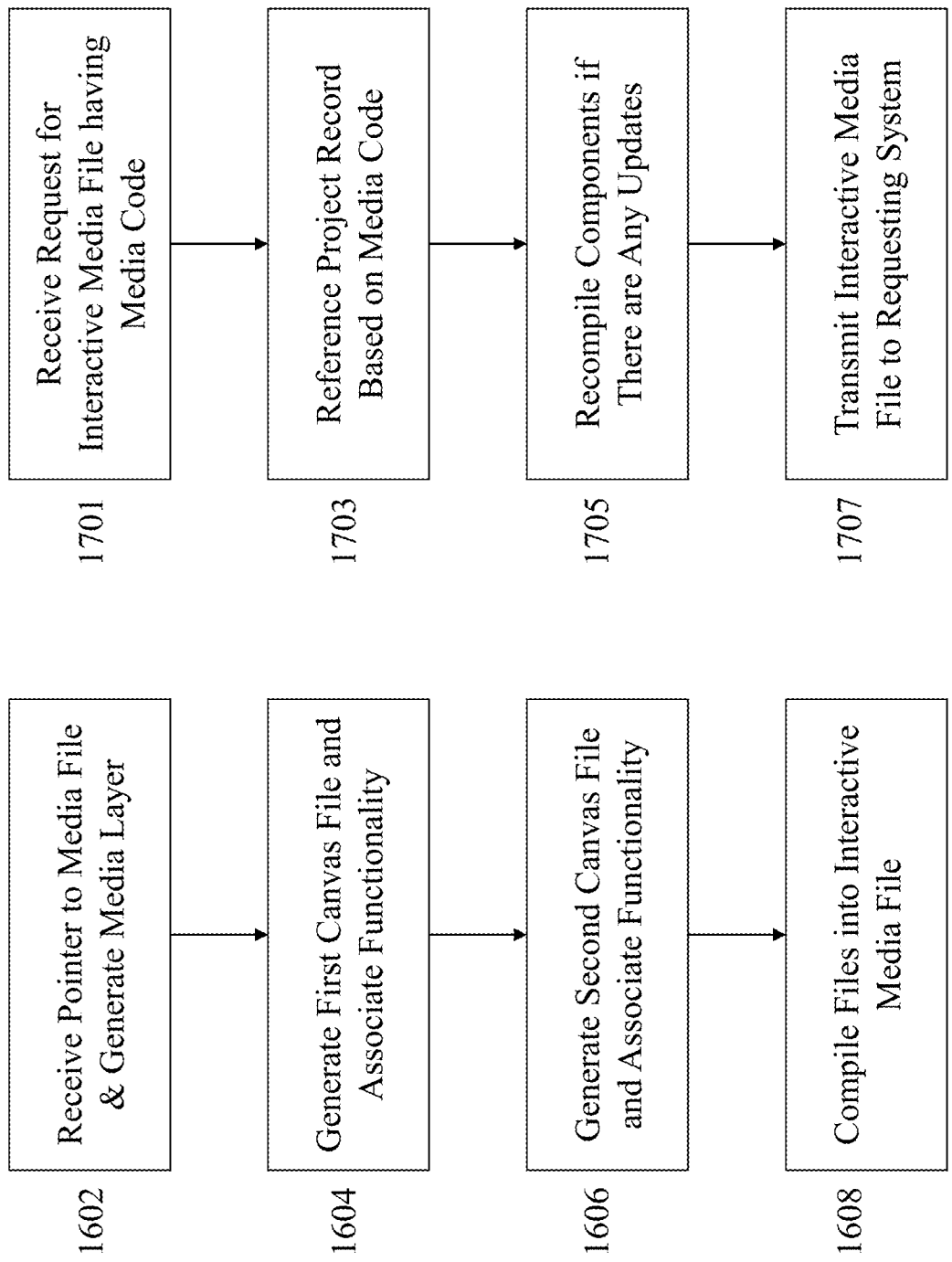

METHODS AND SYSTEMS FOR MULTIMEDIA CONTENT

CROSS-REFERENCE TO RELATED APPLICATIONS

This non-provisional application claims the benefit of World Patent Application PCT/CA2015/051092, entitled "Methods and Systems for Multimedia Content" filed Oct. 27, 2015, which itself claims priority from U.S. Provisional Application No. 62/068,867, entitled "Methods and Systems for Multimedia Content," filed Oct. 27, 2014, the entire content of which are incorporated by reference herein in its entirety.

TECHNICAL FIELD

This invention relates to hypermedia links associating secondary multimedia content to primary multimedia content and more particularly to the self-contained linking/embedding of the secondary multimedia content to primary multimedia content through micro-domains and micro-websites.

BACKGROUND

The Internet is a global system of interconnected computer networks that use the standard Internet protocol suite communication protocols, e.g. TCP/IP, to link several billion devices worldwide. It is essentially a network of networks that consists of millions of private, public, academic, business, and government networks, of local to global scope, that are linked by a broad array of electronic, wireless, and optical networking technologies. The Internet carries an extensive range of information resources and services, such as the inter-linked hypertext documents and applications of the World Wide Web (WWW), the infrastructure to support email, and peer-to-peer networks for file sharing and telephony.

At the same time wireless communication systems today have fundamentally changed how consumers, advertisers, and enterprises interact, communicate, exchange, store, and utilize information through a variety of formats including text, electronic mail, video, multimedia, and plain-old-telephone-service (POTS) as well as through a variety of mobile wireless devices from cellular telephones (cellphones), personal digital assistants (PDAs), laptops, tablet PCs, portable multimedia players, and portable gaming consoles. Electronic content previously accessible only through a large bulky personal computer or computer terminal has with advances in semiconductor electronics, displays and wireless communications become accessible to users upon lightweight portable devices essentially anywhere the user roams.

As of April 2014, approximately 3 billion people, nearly 40% of the world's human population have an Internet connection. Over the past thirty years most traditional communications media including telephone, music, film, and television are being reshaped or redefined by the Internet, giving birth to new services such as voice over Internet Protocol (VoIP) and Internet Protocol television (IPTV). Newspaper, book, and other print publishing are adapting to website technology, or are reshaped into blogging and web feeds. The Internet has enabled and accelerated new forms of human interactions through instant messaging, Internet forums, and social networking. Online shopping has boomed both for major retail outlets and small artisans and traders. Business-to-business and financial services on the Internet affect supply chains across entire industries.

However, despite all of these advances some fundamental aspects of user engagement with the content they access and view have remained essentially unchanged. Today, streaming media is a major growth sector. Today, mid-2014 streaming video takes up more than one-third of Internet traffic during normal television-watching hours and on average people spend twice as much time on the Internet as they do watching television. Streaming video due to its large data demand represents approximately 75% of all Internet traffic in areas such as North America. Yet, the user experience is the same, select the content to watch and simply watch it. Rather than being restricted to when the content was being broadcast as with television the user can select when to start viewing whenever they want, pause, re-start, etc. Basically exactly the same features as video recorders have provided for the past nearly 40 years. Even where accessed from within a website the functionality provided to the viewer is nothing new. For many generators of the video content, e.g. advertisers, music companies, etc. they are still dependent upon multiple other Internet and web elements to convert a video viewing into anything else.

Accordingly, it would be beneficial to provide multimedia content producers with the means to facilitate viewer engagement and transactions directly through the user's viewing of the multimedia content in shareable multimedia content elements. Additionally, it would be beneficial to provide viewers with extensible content through their accessing and engagement with an item of shareable multimedia content or its elements.

Accordingly, it would be beneficial to provide multimedia content that facilitates:

Users to perform transactions directly inside sharable web based primary multimedia content;

Users to complete other functions relevant to them inside sharable web based primary multimedia content;

Users to embed secondary multimedia content and website functionality within sharable web based primary multimedia content;

Users to render their primary multimedia content interactive whilst enabling content monetization, viewer analytics, and distribution management;

Users to browse secondary multimedia content, access secondary multimedia content etc. associated with the primary multimedia content they are viewing;

Users to purchase products, participate in surveys, view schedules, and perform other actions;

Provisioning of website functionality within an item of primary multimedia content such that it becomes a fluid means of accessing multimedia content rather than a discrete disassociated element of a website; and Primary multimedia content being a micro-website.

Other aspects and features of the present invention will become apparent to those ordinarily skilled in the art upon review of the following description of specific embodiments of the invention in conjunction with the accompanying figures.

SUMMARY

It is an object of the present invention to address limitations within the prior art relating providing users with a rich multimedia environment through exploitation of hypermedia links associating secondary multimedia content to primary multimedia content and more particularly to the self-contained linking/embedding of the secondary multimedia content to primary multimedia content through micro-domains and micro-websites.

According to an embodiment, a computer-implemented method comprises generating, by a computer, a media layer file comprising programmatic code indicating a storage location of a media file configured to be displayed on a graphical user interface; generating, by a computer, a first canvas layer file comprising programmatic code defining a set of one or more coordinates corresponding to the media layer and configured as a hypermedia link triggering display of one or more second canvas layers; generating, by a computer, a second canvas layer file comprising programmatic code defining a set of one or more coordinates corresponding to the first canvas layer and the media layer, the set of coordinates configured to be a hypermedia link triggering display of a user interface, and the second canvas layer configured to communicate data between an end-user device and a third-party server; and assembling, by the computer, an interactive media file based upon the respective programmatic code of the media layer, the first canvas layer, and the second canvas layer.

According to another embodiment, a system comprises a development server comprising a processor hosting a development application configured to generate a media layer file, a first canvas file, and a second canvas file according to one or more inputs received from a designer device, the development server further configured to assemble an interactive media file based upon the media layer file, the canvas file, and the second canvas file, and transmit the interactive media file to one or more remote servers; and a remote server comprising a processor hosting a media player configured to execute the interactive media file, the remote server configured to request the interactive media file from the development server.

According to another embodiment, a method comprises displaying to a user an item of primary multimedia content as a first layer of a display to the user; overlaying to the first layer of the display a second layer of the display, the second layer of the display comprising at least one hypermedia link icon of a plurality of hypermedia link icons, wherein selection of the at least one hypermedia link icon of the plurality of hypermedia link icons results in the opening and display of a micro-website within a third layer of the display.

According to another embodiment, the method relating to multimedia content above wherein at least one of: the micro-website is one of a plurality of micro-websites selected in dependence upon the at least one hypermedia link icon of the plurality of hypermedia link icons; the selection of the at least one hypermedia link icon of the plurality of hypermedia link icons results in the item of primary multimedia content pausing; the at least one hypermedia link icon of the plurality of hypermedia link icons is associated with an item within the primary multimedia content and the micro-website allows the user to purchase the item associated with the at least one hypermedia link icon of the plurality of hypermedia link icons without accessing another webpage; the at least one hypermedia link icon of the plurality of hypermedia link icons is associated with an item within the primary multimedia content, and the micro-website allows the user to access and view secondary multimedia content associated with the item within the primary multimedia content.

According to another embodiment, the method relating to multimedia content above wherein at least one of the at least one hypermedia link icon of the plurality of hypermedia link icons is at least one of visible to the user, invisible to the user, displayed as a modification to the image of an item within the primary multimedia content to which the at least one hypermedia link icon of the plurality of hypermedia link icons, and displayed as a thumbnail image of an item within the primary multimedia content to which the at least one hypermedia link icon of the plurality of hypermedia link icons; and the at least one hypermedia link icon of the plurality of hypermedia link icons is associated with an item within the primary multimedia content, and the micro-website allows the user to access and view secondary multimedia content associated with the item within the primary multimedia content such that the selection of the item within the primary multimedia content results in the viewer being presented the secondary multimedia content as an overlay to the primary multimedia content without a change in the webpage the viewer has accessed to view the primary multimedia content.

According to another embodiment, a method comprising displaying content to a user relating to an item within primary multimedia content by providing a hypermedia link icon as a second layer of a display presented to the user wherein a first layer of the display is the primary multimedia content and selection of the hypermedia link icon results in the content being presented to the user within a micro-website displayed as an overlay to a predetermined portion of the primary multimedia content.

According to another embodiment, the method relating to multimedia content above wherein the hypermedia link icon and the micro-website are bound to the primary multimedia content.

According to another embodiment, a method comprising of sharing primary multimedia content comprising providing a uniform resource locator and an embed code relating to the provisioning of at least one of a hypermedia link icon and a micro-website, the at least one of allowing a viewer of the primary multimedia content to access secondary multimedia content without navigating to another webpage According to another embodiment, a method comprising providing for a temporary hypermedia link icon to be active in association with primary multimedia content a location for the hypermedia link icon within the display image of the primary multimedia content, a time for displaying the hypermedia link icon, and a dimension of the hypermedia link icon; and associating with the hypermedia link icon at least one item of secondary multimedia content, wherein the secondary multimedia content will be presented to a viewer of the primary multimedia content based upon the viewer selecting the temporary hypermedia link icon during the period of time it is active.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 14 shows execution of an exemplary method of generating a new interactive media project that may be distributed to any number of devices, according to an exemplary embodiment.

FIG. 15 shows execution of an exemplary method 1700 of distributing a requested interactive media file to a requesting device, according to an exemplary embodiment.

DETAILED DESCRIPTION

Figure 1A:
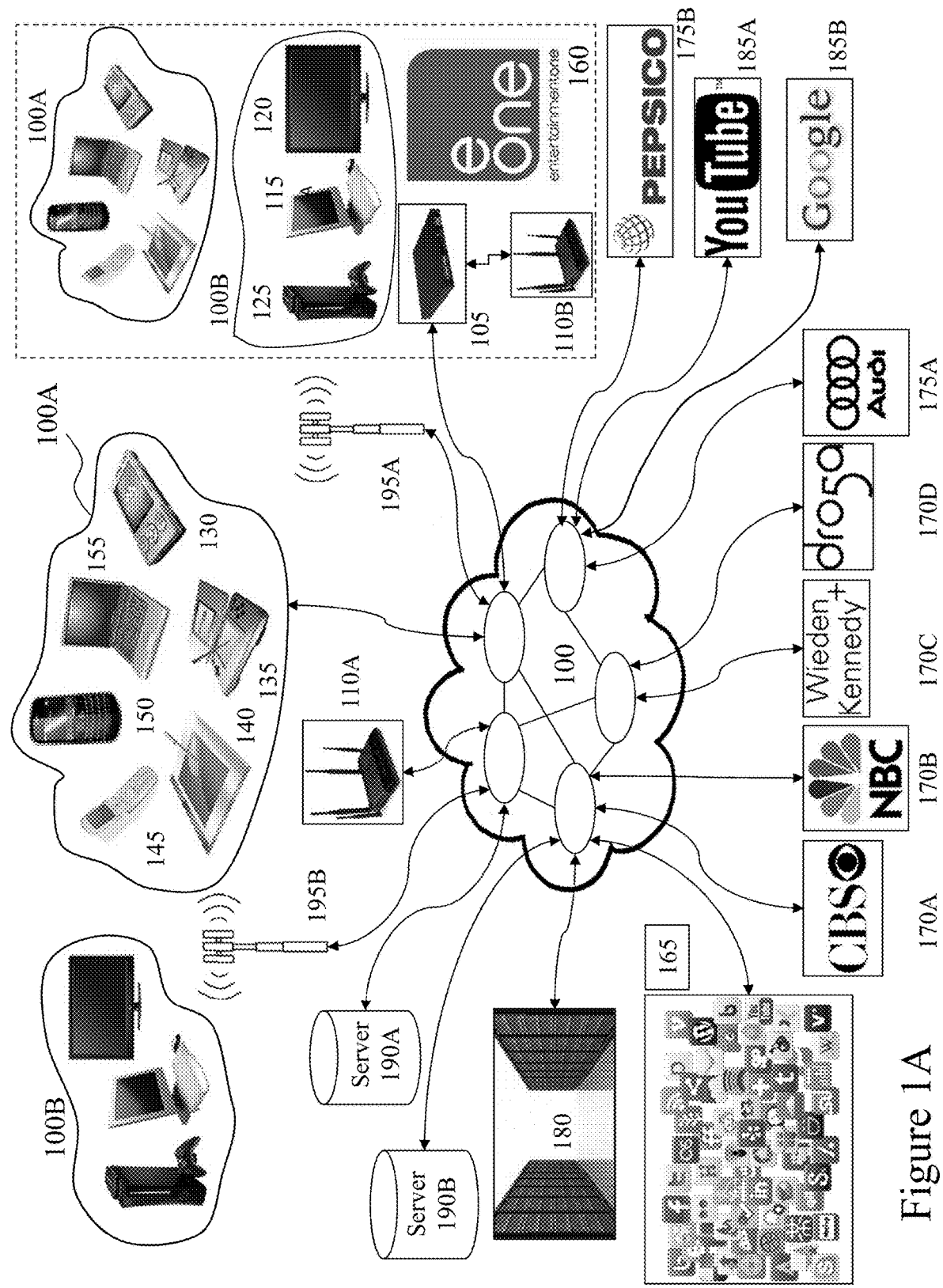
FIG. 1A depicts a network environment within which embodiments of the invention relating to hypermedia content may be employed.

The present invention is directed to hypermedia links associating secondary multimedia content to primary multimedia content and more particularly to the self-contained linking/embedding of the secondary multimedia content to primary multimedia content through micro-domains and micro-websites.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider," as used herein, may refer to, but is not limited to, a third-party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals whose biometric data may be, but not limited to, monitored, acquired, stored, transmitted, processed and analysed either locally or remotely to the user wherein by their engagement with a service provider, third party provider, enterprise, social network, social media etc. via a dashboard, web service, website, software plug-in, software application, graphical user interface acquires, for example, electronic content. This includes, but is not limited to, private individuals, employees of organizations and/or enterprises, members of community organizations, members of charity organizations, men, women, children, teenagers, and animals. In its broadest sense the user may further include, but not be limited to, software systems, mechanical systems, robotic systems, android systems, etc. that may be characterised by an ability to interact with an electronic device and/or electronic system presenting multimedia content with hypermedia links.

"User information" as used herein may refer to, but is not limited to, user behavior information and/or user profile information. It may also include a user's biometric information, an estimation of the user's biometric information, or a projection/prediction of a user's biometric information derived from current and/or historical biometric information, user personal information, user biographic information, user demographic information and user financial and/or financial instrument information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, sensors (e.g. environmental, medical, biological, physiological, chemical, ambient environment, position sensors, and neurological), medical systems (e.g. drug delivery systems, medical testing systems and medical diagnosis devices), and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Non-limiting types of digital content may include popular media types such as MP3, JPG, AVI, TIFF, AAC, TXT, RTF, HTML, XHTML, PDF, XLS, SVG, WMA, MP4, FLV, and PPT, as well as others. Digital content may include any type of digital information, e.g., digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request; said request may be a query, a search, a trigger, an alarm, and a message for example.

Reference to "content information" as used herein may refer to, but is not limited to, any combination of content features, content serving constraints, information derivable from content features or content serving constraints (referred to as "content derived information"), and/or information related to the content (referred to as "content related information"), as well as an extension of such information (e.g., information derived from content related information).

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as JavaScript, etc.). In many cases, a document has a unique, addressable, storage location and can therefore be uniquely identified by this addressable location such as a universal resource locA tor (URL) for example used as a unique address used to access information on the Internet.

"Document information" as used herein may refer to, but is not limited to, may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

A "user interface", also referred to as a "controller" or "haptic interface", as used herein may refer to a device and/or system capturing one or more actions of a user and providing these to a software application. Accordingly, a user interface may include an image capture/processing system, a gesture recognition system, a stylus, a wearable device, a touchscreen, a keypad, a mouse, a touchpad, a microphone, a tablet, an accelerometer, and a motion recognition system.

A "website", also referred to as a website or simply site, refers to one or more related web pages typically served from a single web domain. A website is typically hosted on at least one web server, accessible via a network such as the Internet or a private local area network through an Internet address known as a Uniform Resource LocA tor (URL). A webpage is a document, typically written in plain text interspersed with formatting instructions of a Hypertext Markup Language (e.g. HTML or XHTML) which may be accessed and transported with a protocol, such as Hypertext Transfer Protocol (HTTP) for example, which may optionally employ encryption (e.g. HTTP Secure (HTTPS)) to provide security and privacy for the user of the webpage content. Within the context of embodiments of the invention a micro-website is a website accessed directly from a hypermedia link within an item of primary multimedia content inaccessible to the user except through the hypermedia link wherein the content of the micro-website is presented to the user within the primary multimedia content as secondary multimedia content. Within embodiments of the invention the micro-website may, for example, be hosted with the primary multimedia content and streamed upon access, may be hosted remotely independent of the primary multimedia content and only indicated and/or accessible with a network connection, associated with the primary multimedia content and stored embedded within the primary multimedia content, or associated with the primary multimedia content and stored separately to the primary multimedia content A "web domain", also referred to as a "domain name" or simply "domain", is more strictly a fully qualified domain name, which is also referred to as an absolute domain name, is a domain name that specifies its exact location in the tree hierarchy of the Domain Name System. It specifies all domain levels, including the top-level domain and the root zone. A fully qualified domain name is distinguished by its lack of ambiguity: it can only be interpreted one way. Within the context of embodiments of the invention a micro-domain is a domain accessed directly from a hypermedia link within an item of primary multimedia content inaccessible to the user except through the hypermedia link wherein the content of the micro-domain is presented to the user within the primary multimedia content as secondary multimedia content.

Some websites require a subscription to access some or all of their content. Examples of subscription websites include many business sites, parts of news websites, academic journal websites, gaming websites, file-sharing websites, message boards, web-based email, social networking websites, websites providing real-time stock market data, and websites providing various other services (e.g., websites offering storing and/or sharing of images, files and so forth "Multimedia content", also referred to as "content" or "electronic content", as used herein may refer to electronic content employing a combination of different content or electronic content employing a discrete form of content. As such the discrete or different content may be selected from those including, but not limited to, text, audio, still images, video, animation, and computer generated images.

A "hypermedia link", also referred to as a "spot," refers to an element which references to data that allows secondary multimedia content to be presented to a viewer of an item of primary multimedia content based upon a selection of the hypermedia link but an action such as clicking, swiping through, and hovering for example. Such hypermedia links may themselves include other hypermedia links allowing the viewer to navigate within the secondary multimedia content and/or perform specific actions in relation to an item/element within the primary and/or secondary multimedia content to which the hypermedia link is associated. According to embodiments of the invention the hypermedia link provide a non-linear medium of accessing additional information within an item of multimedia content as opposed to external to the item of multimedia content such that the item of primary multimedia content with secondary multimedia content accessed via hypermedia links may be shared in similar manner to prior art multimedia content.

"Hypermedia content" as used herein refers to multimedia content such as primary multimedia content or secondary multimedia content accessed from primary multimedia content that includes hypermedia links allowing direct within hypermedia content access to secondary multimedia content based upon the hypermedia link enabled within the primary multimedia content.

Referring to FIG. 1A, there is depicted a network environment 100 within which embodiments of the invention may be employed supporting Hypermedia Content Systems and Hypermedia Content Distribution Applications/Platforms (HCS-HCDAPs) according to embodiments of the invention. Such HCS-HCDAPs, for example supporting multiple channels and dynamic content. As shown first and second user groups 100A and 100B respectively interface to a telecommunications network 100. Within the representative telecommunication architecture, a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100 A and 100B respectively. Also connected to the network 100 are first and second Wi-Fi nodes 110A and HOB, the latter of which being coupled to network 100 via router 105. Second Wi-Fi node HOB is associated with Enterprise 160, e.g. Entertainment One™, within which other first and second user groups 100A are and 100B. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195 A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195 A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, FEEE 802.11, IEEE 802.15, FEEE 802.16, IEEE 802.20, UMTS, GSM 850, GSM 900, GSM 1800, GSM 1900, GPRS, ITU-R 5.138, ITU-R 5.150, ITU-R 5.280, and EVIT-1000. It would be evident to one skilled in the art that many portable and fixed electronic devices may support multiple wireless protocols simultaneously, such that for example a user may employ GSM services such as telephony and SMS and Wi-Fi WiMAX data transmission, VOIP and Internet access. Accordingly, portable electronic devices within first user group 100 A may form associations either through standards such as IEEE 802.15 and Bluetooth as well in an ad-hoc manner.

Also connected to the network 100 are Social Networks (SOCNETS) 165, first and second distribution networks 170A and 170B respectively, e.g. CBS™ and NBC™, first and second advertising agencies 170C and 170D respectively, e.g. Wieden & Kennedy and Droga5, first and second advertisers 175 A and 175B respectively, e.g. Audi™ and PepsiCo™, and first and second channel providers 185 A and 185B respectively, e.g. YouTube™ and Google™, as well as first and second servers 190A and 190B which together with others, not shown for clarity. First and second servers 190A and 190B may host according to embodiments of the inventions multiple services associated with a provider of Hypermedia Content Systems and Hypermedia Content Distribution Applications/Platforms (HCS-HCDAPs) publishing applications/platforms (HCS-HCDAPs); a provider of a SOCNET or Social Media (SOME) exploiting HCS-HCDAP features; a provider of a SOCNET and/or SOME not exploiting HCS-HCDAP features; a provider of services to PEDS and/or FEDS; a provider of one or more aspects of wired and/or wireless communications; an Enterprise 160, for example Entertainment One™, exploiting HCS-HCDAP features; license databases; content databases; image databases; content libraries; customer databases; websites; and software applications for download to or access by FEDs and/or PEDs exploiting and/or hosting HCS-HCDAP features. First and second primary content servers 190A and 190B may also host for example other Internet services such as a search engine, financial services, third party applications and other Internet based services.

Accordingly, a consumer and/or customer (CONCUS) may exploit a PED and/or FED within an Enterprise 160, for example, and access one of the first or second primary content servers 190A and 190B respectively to perform an operation such as accessing/downloading an application which provides HCS-HCDAP features according to embodiments of the invention; execute an application already installed providing HCS-HCDAP features; execute a web based application providing HCS-HCDAP features; or access content. Similarly, a CONCUS may undertake such actions or others exploiting embodiments of the invention exploiting a PED or FED within first and second user groups 100 A and 100B respectively via one of first and second cellular APs 195A and 195B respectively and first Wi-Fi nodes 110A.

Figure 1B:
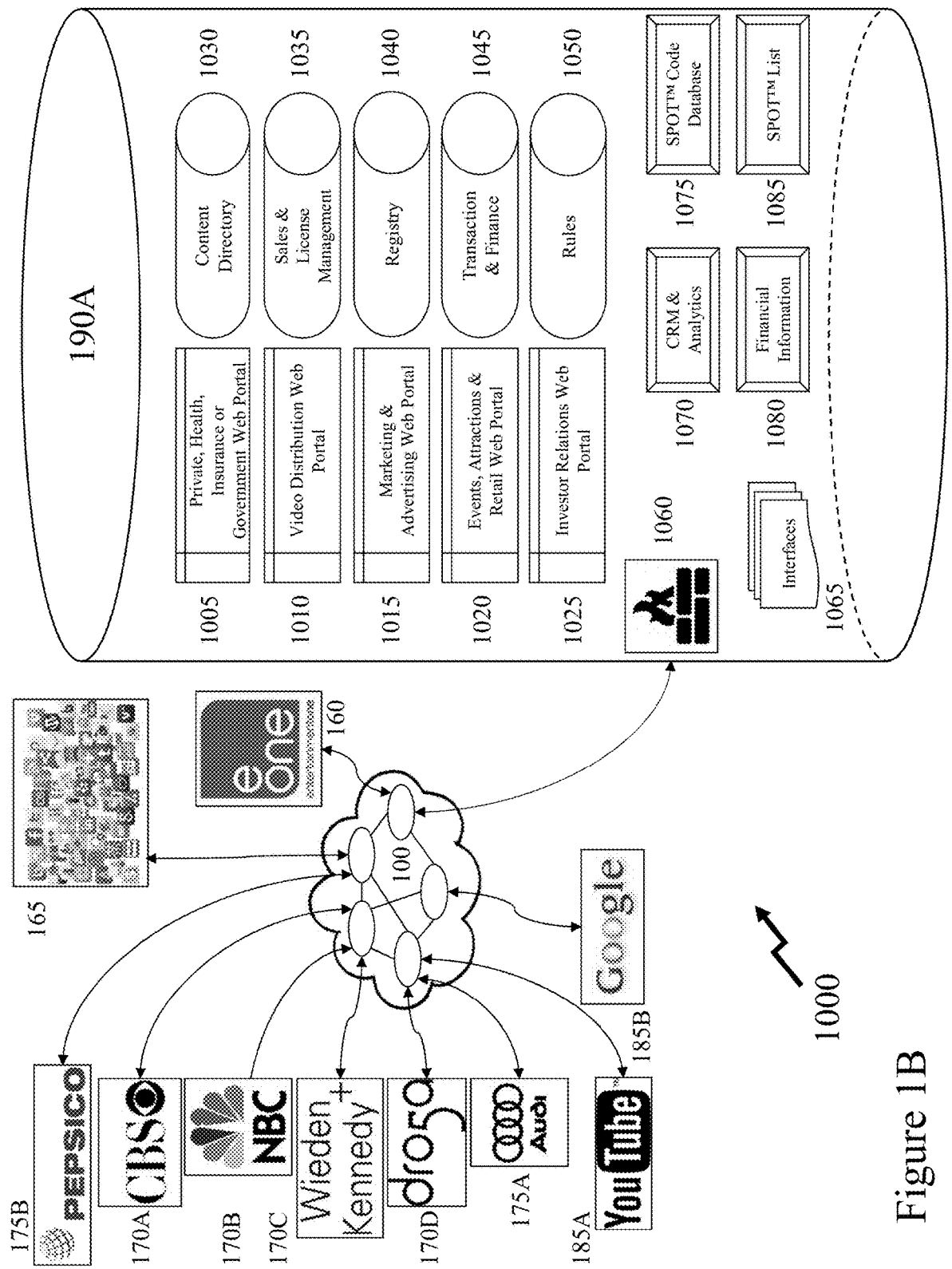
FIG. 1B depicts elements of a server and portal based infrastructure for hypermedia content provisioning and support according to an embodiment of the invention.

Now referring to FIG. 1B there is depicted an architecture 1000 according to an embodiment of the invention wherein as with FIG. 1A there are connected to network 100 Social Networks (SOCNETS) 165, first and second distribution networks 170A and 170B respectively, e.g. CBS™ and NBC™, first and second advertising agencies 170C and 170D respectively, e.g. Wieden & Kennedy and Droga5, first and second advertisers 175A and 175B respectively, e.g. Audi™ and PepsiCo™, and first and second channel providers 185 A and 185B respectively, e.g. YouTube™ and Google™, and first server 190A. As depicted server 190A incorporates first to fifth portals 1005 to 1025 representing, for example, Public, Health, Insurance and Government Web Portal; Video Distribution Web Portal; Marketing and Advertising Web Portal; Events, Attractions, and Retail Web Portal; and Investor Relations Web Portal respectively. Accordingly, an item of primary multimedia content and its associated hypermedia links/secondary multimedia content may be accessed and/or associated with a particular web portal on the Server 190A. Optionally, first and second distribution networks 170A and 170B respectively, e.g. CBS™ and NBC™, first and second advertising agencies 170C and 170D respectively, e.g. Wieden & Kennedy and Droga5, first and second advertisers 175A and 175B respectively, e.g. Audi™ and PepsiCo™, and first and second channel providers 185 A and 185B respectively, e.g. YouTube™ and Google™, may be associated with specific web portals or may be associated with multiple web portals on first server 190A.

Also associated with first server 190A are first to fifth databases 1030 to 1050 respectively representing, for example, Content Directory; Sales & License Management; Registry; Transaction & Finance; and Rules. Also associated with first server 190A are firewall 1060 and other security measures associated with protecting the first server 190A from electronic attack, not shown for clarity. Additionally, Interfaces 1065 support the various interface requirements of the different networks, systems, server clusters, second server 190B, network 100, etc. to which the first server 190A is connected as well as the various interfaces necessary to interface the web portals to the first to fifth databases 1030 to 1050 respectively and memory, not shown for clarity. Also implemented within first server 190 A are CRM & Analytics 1070, an Interactive Code Database 1075, Financial Information 1080, and an Interactive List 1085. The interactive elements (e.g., hypermedia links, spots) of the Interactive Code Database 1070 and Interactive List 1085 being an implementation of micro-websites accessible and navigable within an item of multimedia content via hypermedia links provided by ZED Creative of Charlottetown, Prince Edward Island, Canada. Accordingly, first server 190A together with others including, but not limited to, second server 190B provide users, viewers, consumers, advertisers, enterprises, third parties, service providers, multimedia content generators, and others with the subset of HCS-HCDAP features applicable to their activities.

Figure 1C:
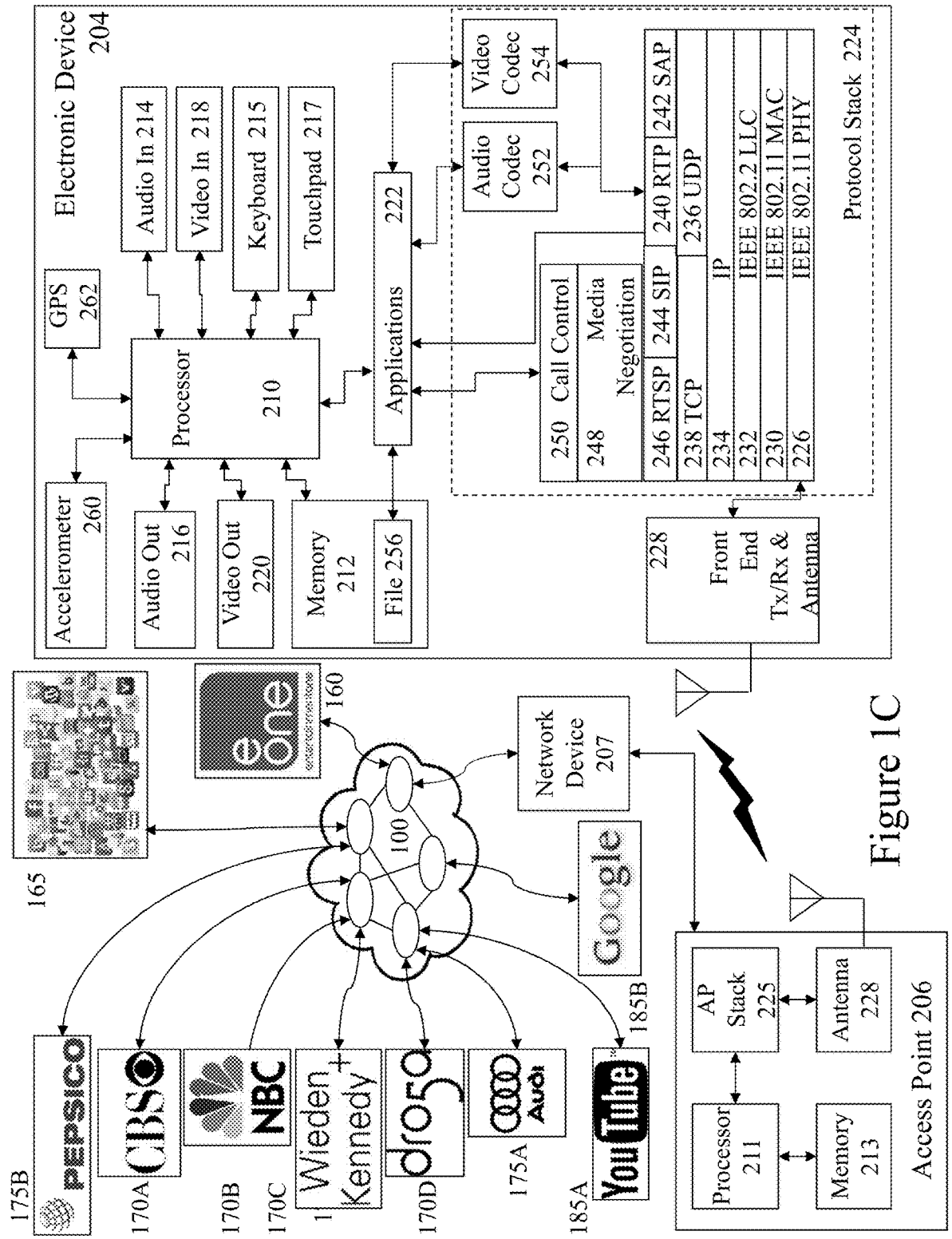
FIG. 1C depicts a wireless portable electronic device supporting communications to a network such as depicted in FIG. 1A and as supporting embodiments of the invention.

Now referring to FIG. 1C there is depicted an electronic device 204 and network access point 207 supporting HCS-HCDAP features according to embodiments of the invention. Electronic device 204 may, for example, be a PED and/or FED and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to network 100 and therein Social Networks (SOCNETS) 165, first and second distribution networks 170A and 170B respectively, e.g. CBS™ and NBC™, first and second advertising agencies 170C and 170D respectively, e.g. Wieden & Kennedy and Droga5, first and second advertisers 175A and 175B respectively, e.g. Audi™ and PepsiCo™, and first and second channel providers 185 A and 185B respectively, e.g. YouTube™ and Google™.

The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, nonvolatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one or more applications 222. Alternatively, the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 228, an IEEE 802.11-compatible MAC module 230 coupled to an FEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, FP module 234, LLC module 232 and MAC module 230.

It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, FEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Figure 2:
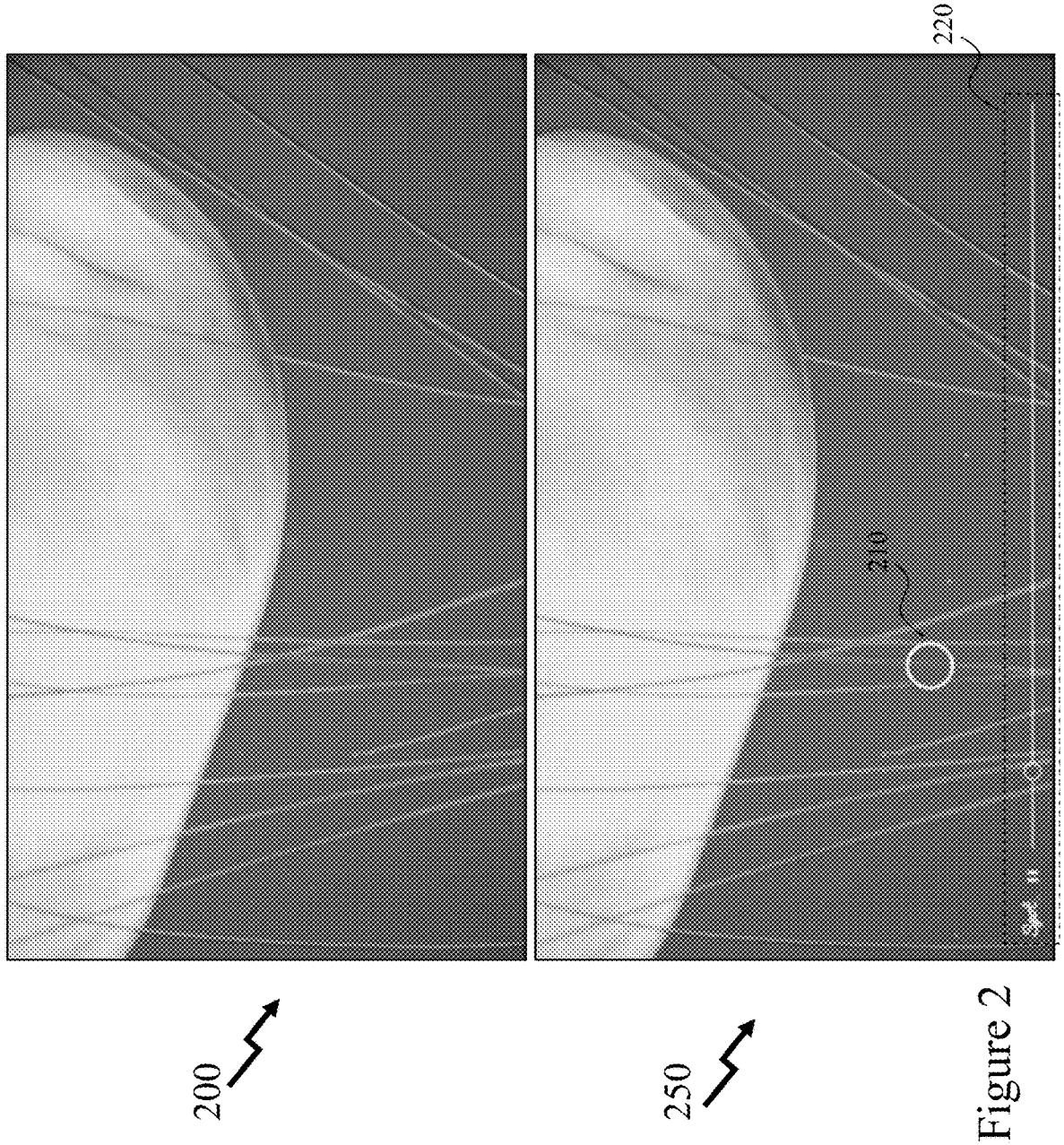
FIG. 2 depicts a visual indicator of a hypermedia link within multimedia content presented to a user according to an embodiment of the invention.

Now referring to FIG. 2 there is depicted an example of a visual indicator of a hypermedia link within multimedia content presented to a user according to an embodiment of the invention. Accordingly, as depicted a viewer is accessing an item of multimedia content 200 which has hypermedia links associated with it. Accordingly, as the item of multimedia content 200 plays, in this instance a short video sequence as indicated with time bar 220, a hypermedia link icon 210 appears at a predetermined location and time within the item of multimedia content. Selection of the hypermedia link icon 210 results in the associated item of linked secondary multimedia content being presented to the user, such as depicted in respect of FIGS. 4-5 and 7-8 for example.

Optionally, the shape of the hypermedia link icon 210, it's border parameters such as thickness, colour, and transparency for example, together with its fill parameters such as fill colour, transparency, and fill pattern for example, may be established in dependence upon one or more factors including, but not limited to, the palette of the primary multimedia content 200 at time of display, a preference of the user establishing the hypermedia link icon 210, a preference of a view of the primary multimedia content 200, and in dependence upon the actions of the viewer. As evident from FIGS. 10A to 10E other options exist in addition to the modification of the hypermedia link icon 210 in order to highlight the presence of the hypermedia link(s) to the viewer although as evident in FIG. 10E their presence may not be indicated at all to the viewer although their selection of hidden hypermedia link icons 210 will still trigger the same action(s). In these instances, the viewer's true interest may be gauged as well as their selection of other items that are not associated with hypermedia link icons 210 thereby providing the advertiser, service provider, third party provider, etc. additional information in respect of viewer preferences.

Figure 3:
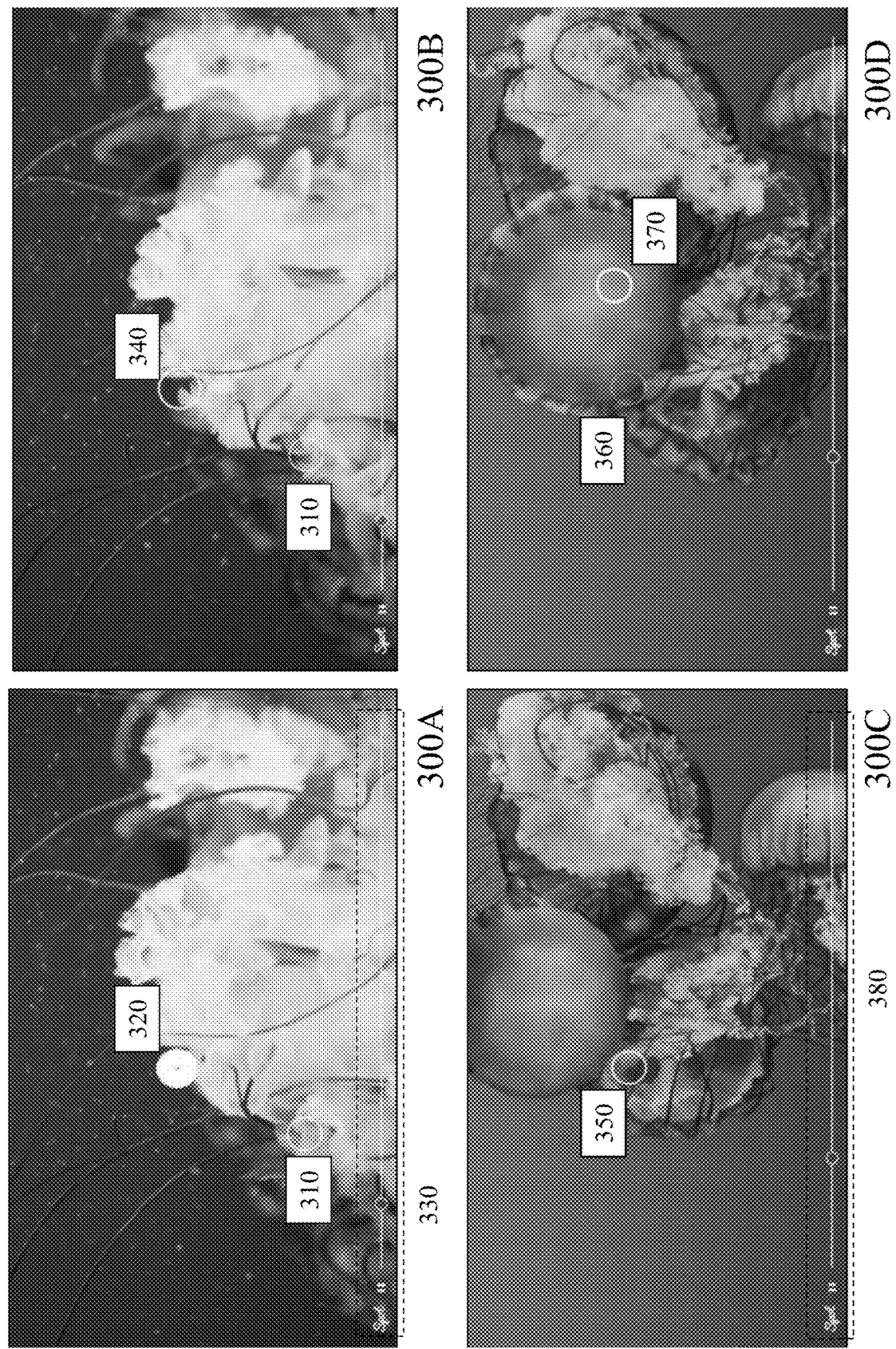
FIG. 3 depicts the evolution of visual indicators relating to hypermedia links within multimedia content presented to a user according to an embodiment of the invention.

Now referring to FIG. 3 there are depicted first to fourth screen images 300A to 300D respectively depicting the evolution of visual indicators relating to hypermedia links within multimedia content presented to a user according to an embodiment of the invention. As depicted in first screen image 300A a timeline 330 of the primary multimedia content is depicted along the bottom of the first screen image 300A together with an already established hypermedia link icon 310 and an evolving hypermedia link icon 320 wherein the evolving hypermedia link icon 320 changes appearance over a period of time until it becomes matured hypermedia link icon 340 as depicted in second screen image 300B with an appearance similar to that of established hypermedia link icon 310. Optionally, the shape of the evolving hypermedia link icon 320, it's border parameters such as thickness, colour, and transparency for example, together with its fill parameters such as fill colour, transparency, and fill pattern for example, may be established in dependence upon one or more factors including, but not limited to, the palette of the primary multimedia content at time of display, a preference of the user establishing the evolving hypermedia link icon 320, a preference of a view of the primary multimedia content 200, and in dependence upon the actions of the viewer. As evident from FIGS. 10A to 10E other options exist in addition to the modification of the evolving hypermedia link icon 320 in order to highlight the presence of the hypermedia link(s) to the viewer. Optionally, the evolving hypermedia link icon 320 may have similar geometry and dimensions to that of established hypermedia link icon 310 or alternatively the evolving hypermedia link icon 320 may have different geometry and dimensions to that of established hypermedia link icon 310.

As depicted in third screen image 300C a timeline of the primary multimedia content 380 is depicted along the bottom of the third screen image 300C together with an already established hypermedia link icon 350. Then as depicted in fourth screen image 300D the established hypermedia link icon 350 is depicted as disappearing hypermedia link icon 360 together with new hypermedia link icon 370. Accordingly, it would be evident that in addition to have an evolving appearance such as depicted in first and second images 300A and 300B respectively the hypermedia link icon may have an evolving disappearance such as depicted in third and fourth images 300C and 300D respectively. Optionally, the shape of the disappearing hypermedia link icon 320, it's border parameters such as thickness, colour, and transparency for example, together with its fill parameters such as fill colour, transparency, and fill pattern for example, may be established in dependence upon one or more factors including, but not limited to, the palette of the primary multimedia content at time of display, a preference of the user establishing the evolving hypermedia link icon, a preference of a view of the primary multimedia content, and in dependence upon the actions of the viewer.

It would be evident that each hypermedia link icon, such as established hypermedia link icon 310, evolving hypermedia link icon 320, matured hypermedia link icon 340, established hypermedia link icon 350, and new hypermedia link icon 370, may be associated with timing information such as a start time and duration, a start time and end time, an evolution time wherein the hypermedia link icon appears from nothing to established form, a devolution time wherein the hypermedia link icon disappears from establish form to nothing. It would also be evident that the appearance of a hyperlink link icon may evolve during the period of time it is present on the primary multimedia content.

Figure 4A:
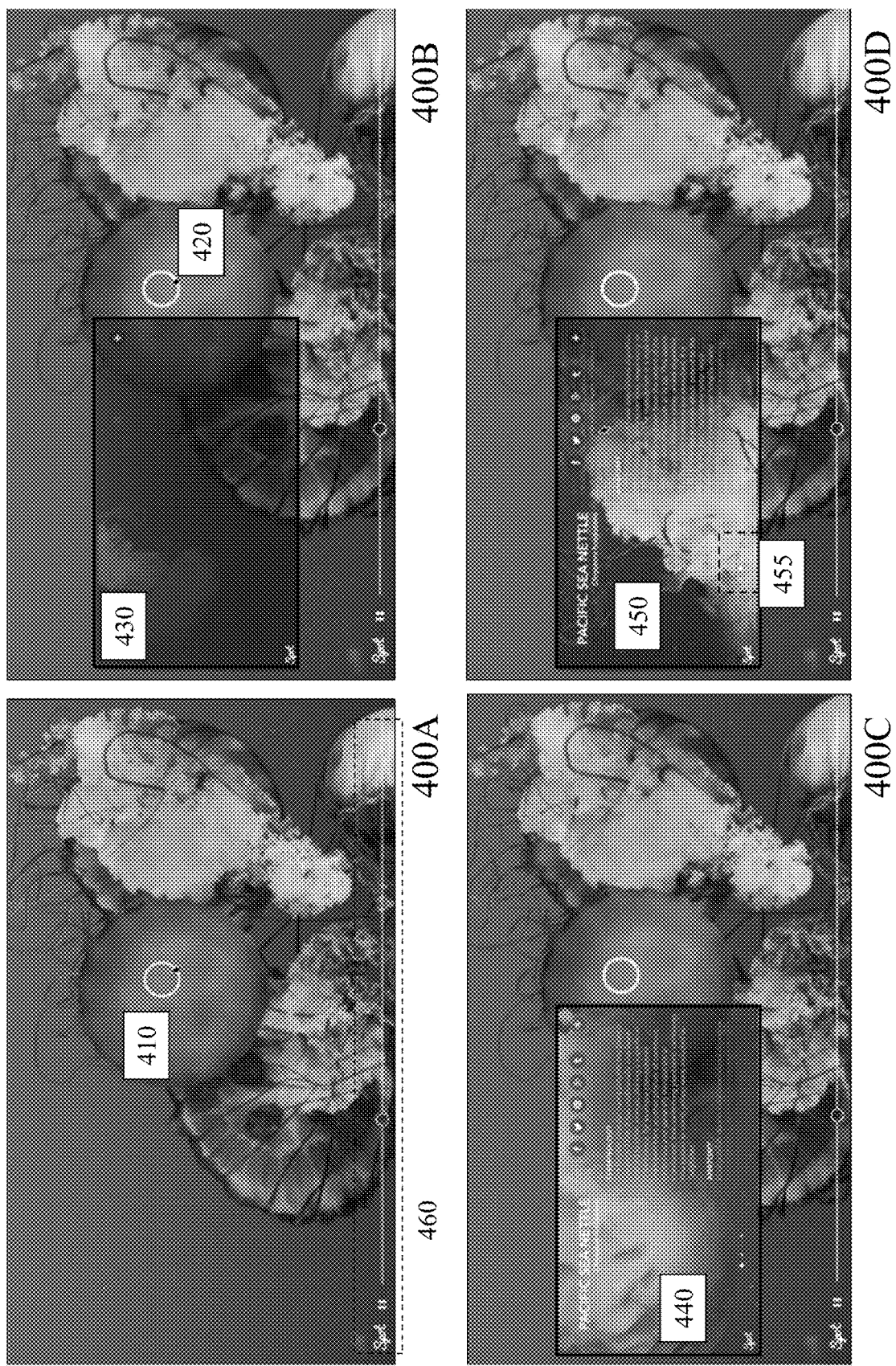
FIGS. 4A and 4B depict the generation of a micro-website within multimedia content presented to a user according to an embodiment of the invention based upon their selection of a hypermedia link within the multimedia content.

Now referring to FIG. 4A there are depicted in first to fourth screen images 400A to 400D respectively relating to the generation of a micro-website within multimedia content presented to a user according to an embodiment of the invention based upon their selection of a hypermedia link within the multimedia content. As depicted in first screen image 400A a timeline 460 of the primary multimedia content is depicted along the bottom of the first screen image 400A together with an already established hypermedia link icon 410. Now, if the user selects the established hypermedia link icon 410 then the secondary multimedia content is accessible by the user through the micro-website which is established from an initial frame 430 in second screen image 400B to micro-website 440 in third screen image 400C. In this instance the primary multimedia content within the first to third screen images 400A to 400C respectively is a Pacific Sea Nettle and the associated content presented within the micro-website 440 is additional information with respect to the Pacific Sea Nettle. Referring to fourth screen image 400D the micro-website content has changed as depicted in second micro-website 450 where the page 455 within the micro-website content has been changed based upon a selection of the user. As depicted within fifth screen image 400E in FIG. 4B the second micro-website 450 in addition to the page 455 selector includes a social media bar 470 with hyperlink icons for social media services associated with the viewer of the primary multimedia content wherein these are established, for example, in dependence upon the user logging into an application providing the HCS-HCDAP or through the known social media associations of the user as they are viewing the primary multimedia content within one of their social media websites or upon an electronic device having their social network applications installed upon it. Selection of a hyperlink icon within the social media bar 470 yields a posting page such as depicted by posting pop-up 510 within first screen image 500A in FIG. 5 for example. Also presented to the user in second micro-website 400E is a link 480 to other features. Cursor 490 is depicted to indicate that the content displayed within a page of the micro-website may itself be larger than the micro-website window and hence the user can scroll/navigate through the content.

Figure 4B:
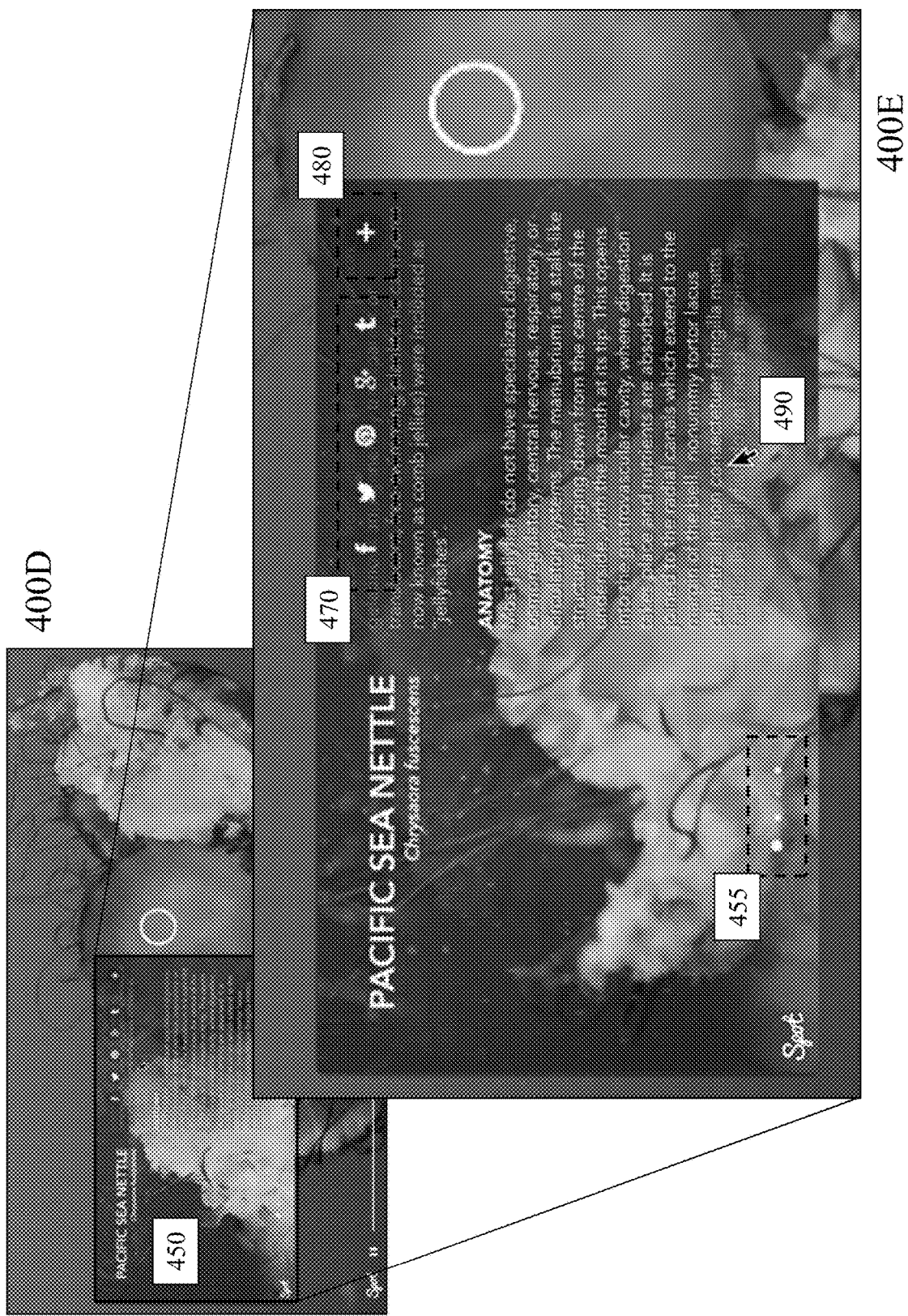
Figure 5:
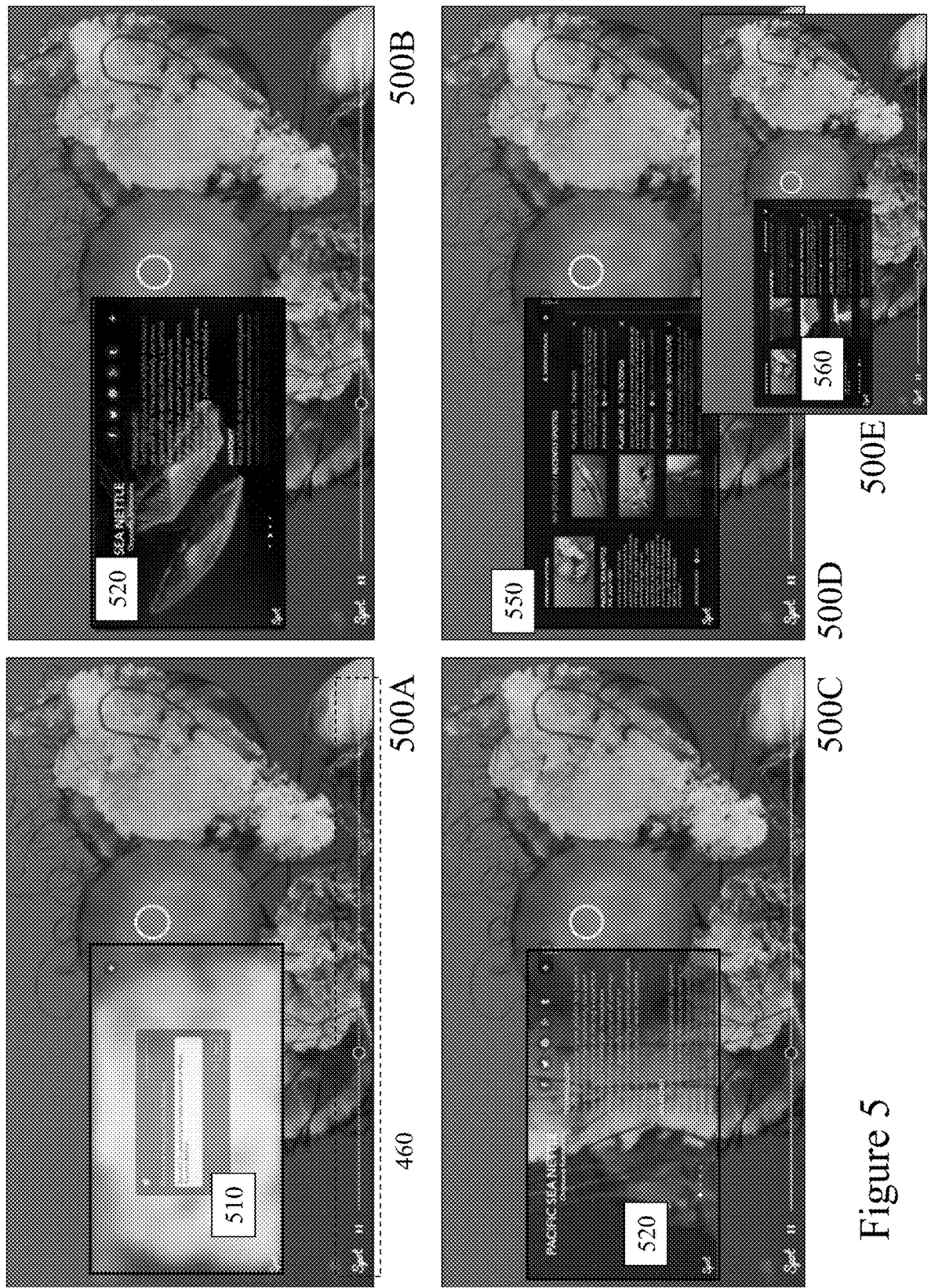
FIG. 5 depicts the navigation of a micro-website within multimedia content presented to a user according to an embodiment of the invention based upon their selection of a hypermedia link within the multimedia content.

Referring to FIG. 5 there are depicted in first to fourth screen images 500A to 500D respectively depicts the navigation of a micro-website within multimedia content presented to a user according to an embodiment of the invention based upon their selection of a hypermedia link within the multimedia content. As already indicated supra first screen image 500A is a social media feed screen within the micro-website allowing user to send a message to a friend or friends, or a subset/set of contacts. In this instance the user is generating a Tweet for Twitter™ wherein when sent (tweeted) the content will be posted to the user's Twitter feed. Second and third screen images 500B and 500C respectively depict additional captures of the micro-website 520 during use by the user wherein they are navigating additional content. The content presented to the user within first to third screen images 500A to 500C together with that as depicted in first to fifth images 400A to 400E in FIGS. 4A and 4B respectively is content associated by the provider of the primary multimedia content.

In contrast the selection of the link 480 depicted within fifth screen image 400E in FIG. 4B provides the user with access to, for example, a search function allowing the user to search for additional content either provided by the provider of the primary secondary content, the provider of the secondary multimedia content presented within the micro-website, or external to the providers of the primary and secondary multimedia content. Accordingly, as depicted in fourth image 500D the user is presented with a list of other secondary multimedia content recently accessed by others in association with the primary multimedia content that the user has accessed within micro-website image 550. Accordingly, selection of an item triggers the presentation of that primary multimedia content within the micro-website. Equally, where the list is long the user may scroll as depicted with scrolled micro-website image 560 in fifth screen image 500E.

Alternatively, the user can select from the options at the top of this page to view their list of viewed primary multimedia content, entitled "My Spot List" in micro-website 550 in fourth screen image 500D, which may be simply a list of the last items of viewed primary multimedia content or alternatively it may be last items of viewed primary multimedia content associated with the current primary multimedia content either independent or dependent upon the selection of hypermedia icons within the viewed primary multimedia content. For example, the user may only wish that those items of viewed primary multimedia content which have caused them to access additional content via a hypermedia link are stored within their viewed primary multimedia content history list for subsequent retrieval. Optionally, the user may store and assign viewed primary multimedia content to categories allowing, for example, revision topics to be established and primary multimedia content allocated to a particular topic. Alternatively, the user may establish topics according to other criteria defined by their personal, employment, social needs and/or desires and/actions.

Figure 6:
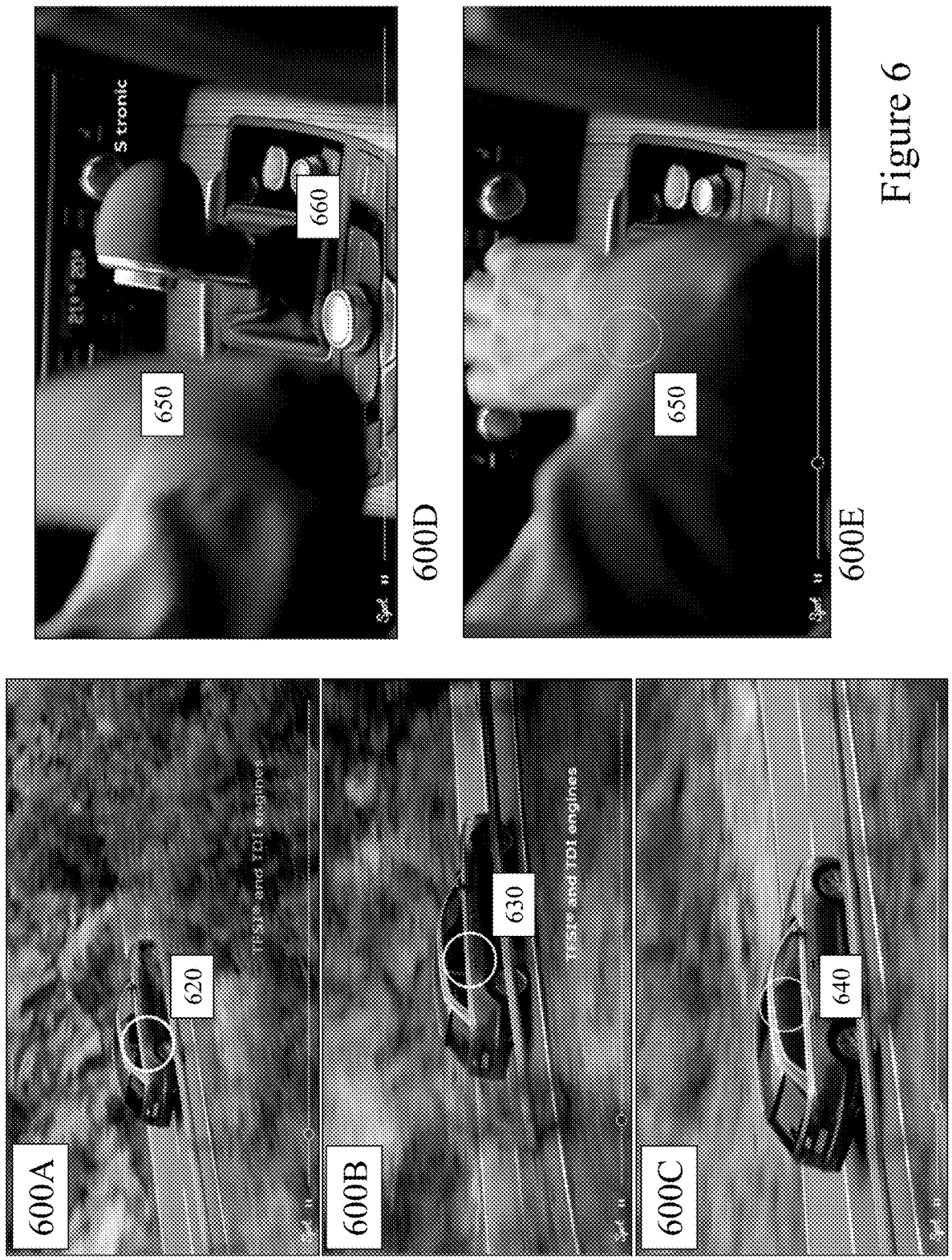
FIG. 6 depicts the evolution of visual indicators relating to hypermedia links within multimedia content presented to a user according to an embodiment of the invention.

Now referring to FIG. 6 there are depicted first to fifth screen images 600A to 600E respectively depicting the evolution of visual indicators relating to hypermedia links within multimedia content presented to a user according to an embodiment of the invention. Referring initially to first to third screen images 600A to 600C respectively there are depicted within each a hypermedia link icon 620 to 640 respectively associated with the vehicle within the advertisement, forming the primary multimedia content, as it drives along the road. Accordingly, the hypermedia link icon is in this instance associated with a moving element within the primary multimedia content rather than being essentially stationary within the first to fourth screen images 300A to 300D respectively, for example. The association of the hypermedia link icon with a moving element within the primary multimedia content may be performed using a variety of techniques known within the art including, but not limited to, identifying the element within multiple frames and interpolating between; identifying the element and pattern recognition identifying the object to automatically associate the hyperlink link icon over the user defined time period; and the user manually selecting on a predetermined number of frames over the defined time period for the hypermedia link icon.

Alternatively, as depicted in fourth and fifth screen images 600D and 600E a hypermedia link icon 650 maintains its position even as the element to which it relates, in this instance the console 660, varies in visibility as the driver's hand engage the gear changer and obscures part of the console 660. In this instance a viewer of the primary multimedia content would be reasonably certain that even selecting the hypermedia link icon 650 in fifth screen image 600E would lead to the provisioning of a micro-website with secondary multimedia content relating to the console 660. If the association of the hypermedia link icon 650 between fourth and fifth screen images 600D and 600E was to vary then the user may be presented, where the hypermedia link icon 650 is visible, with a different representation for the hypermedia link icon 650.

It would be evident to one skilled in the art that as the hypermedia link icon is associated with the primary multimedia content that if the user pauses the primary multimedia content then the hypermedia link icon may be made visible or active even if its position has not been specified directly for the time point of the pause as it may be interpolated from last defined point, for example.

Figure 7:
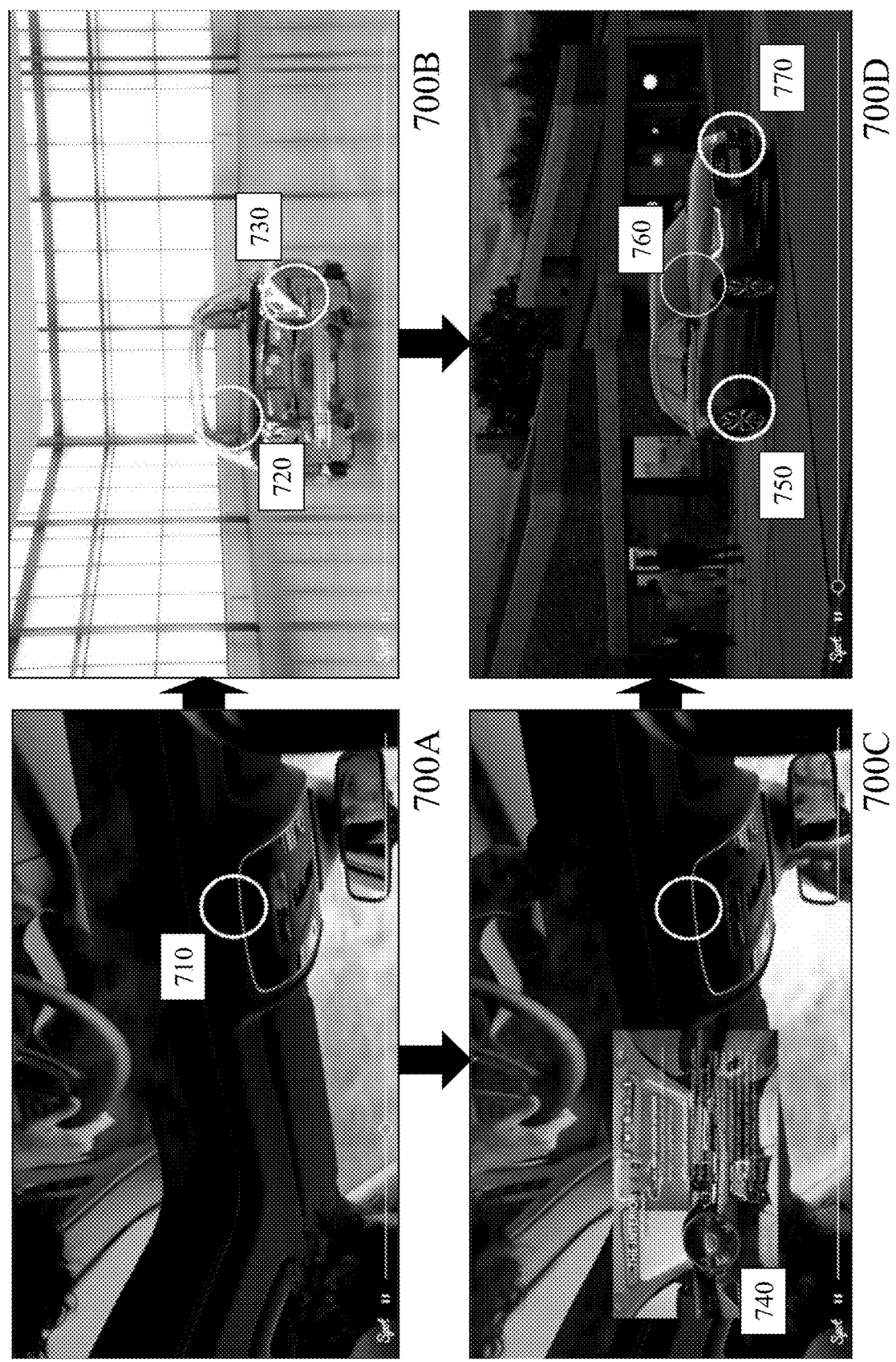
FIG. 7 depicts the generation and evolution of a micro-website within multimedia content presented to a user according to an embodiment of the invention.

Now referring to FIG. 7 there are depicted first to fourth screen images 700A to 700D relating to the generation and evolution of a micro-website within multimedia content presented to a user according to an embodiment of the invention. In this instance the hypermedia link icon 710 is active within the primary multimedia content displayed to the user as represented by first screen image 700A. Its selection triggers the primary multimedia content to follow a first flow through third screen image 700C to fourth screen image 700D together with micro-website 740 and final hypermedia link icons 750 to 770 respectively. However, if the user does not select it then the primary multimedia content follows a second flow through second screen image 700B to fourth screen image 700D and final hypermedia link icons 750 to 770 respectively. Accordingly, within other embodiments of the invention the micro-website is actually taking over the whole display image and overlaying the original content, namely second screen image 700B, and what appears to be micro-website 750 is actually a nano-website embedded within the micro-website presented to the user when they select the hypermedia link icon 710. Not selecting the hypermedia link icon 710 therefore results in the remainder of the original content, namely second screen image 700B, being presented without the micro-website overlay. Accordingly, it would be evident to one skilled in the art that an initial element of primary multimedia content may have a micro-website associated with a hypermedia link icon that displays secondary multimedia content. That primary multimedia content with its associated hypermedia link icon and secondary multimedia content may then be used as the micro-website content for another hypermedia link icon within another element of primary multimedia content. Accordingly, original content with hyperlink media icons and secondary multimedia content, may with the appropriate licensing and legal permissions, be used within another element of primary multimedia content. In this manner, an educational institution may build, for example, a course guide exploiting multimedia content for an advertising element of the course and embed within the course multimedia content advertisements of third parties with their associated hypermedia link icons and secondary multimedia content for example. It would be evident to one skilled in the art that many other such exploitations of nested, stacked, embedded, linked multimedia content may be employed without departing from the scope of the invention.

Figure 8:
FIG. 8 depicts the selection of multiple hypermedia links within an item of multimedia content presented to a user according to an embodiment of the invention based for subsequent viewing and access.

Now referring to FIG. 8 there are depicted first to fifth screen images 800A to 800E relating to the selection of multiple hypermedia links within an item of multimedia content presented to a user according to an embodiment of the invention based for subsequent viewing and access. Within the embodiments of the invention presented supra in respect of FIGS. 3 to 7 the selection of a hypermedia link icon results in the opening and display of a micro-website with secondary multimedia content being presented to the user which they can view, navigate, close, link to social media, etc. However, in FIG. 8 the selection of a hypermedia link icon does not trigger such an action but rather adds the selected hypermedia link icon to a stack for subsequent display, exploitation, social media linking, review etc. Accordingly, in first screen image 800A a user is viewing an item of multimedia content, in this instance an advertisement entitled "Back to Blue" by The Gap™, a clothing store. Next as depicted in zoomed image 850 they select an icon associated with a HCS-HCDAP provider, which activate the hypermedia link icons for display, otherwise the primary multimedia content plays without displaying them. Accordingly:

Second image 800B depicts hypermedia link icons being presented, the selection of one by the user, and the hypermedia link icon counter incrementing to "1" in first insert 800F;

Third image 800C depicts a hypermedia link icons being presented, the selection of it by the user, and the hypermedia link icon counter incrementing to "2" in second insert 800G;

Fourth image 800D depicts a hypermedia link icon being presented, the selection of it by the user, and the hypermedia link icon counter incrementing to "3" in third insert 800F; and Fifth image 800E depicts the end of the advertisement where the user is presented with a summary allowing them to replay the advertisement and presenting that they added 3 hypermedia link icons to their list, in this instance their "Spot List" where the HCS-HCDAP is a media player of content service provider, as described supra.

Figure 9:
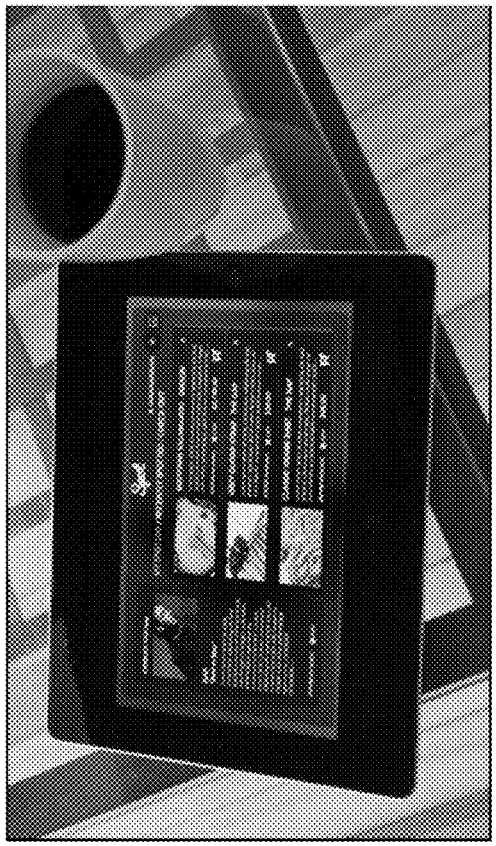
FIG. 9 depicts the subsequent retrieval of multiple hypermedia links selected by a user and associated with an item of multimedia content presented to the user according to an embodiment of the invention.
Figure 9:
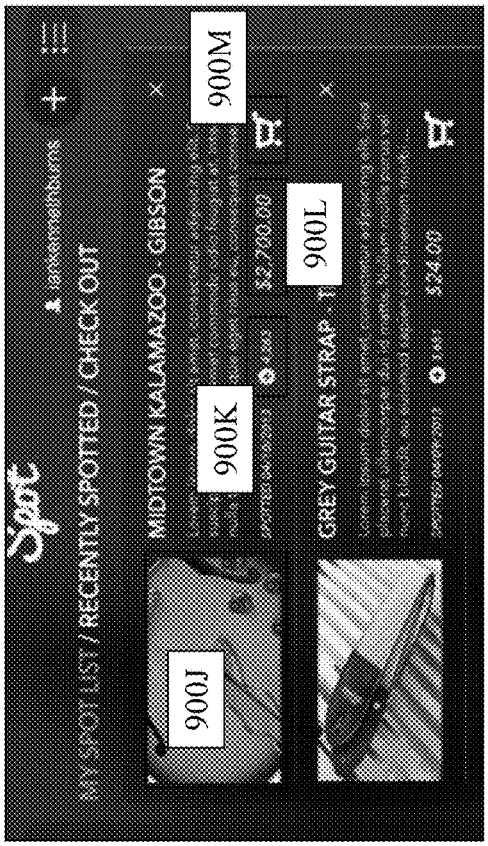
Figure 9:
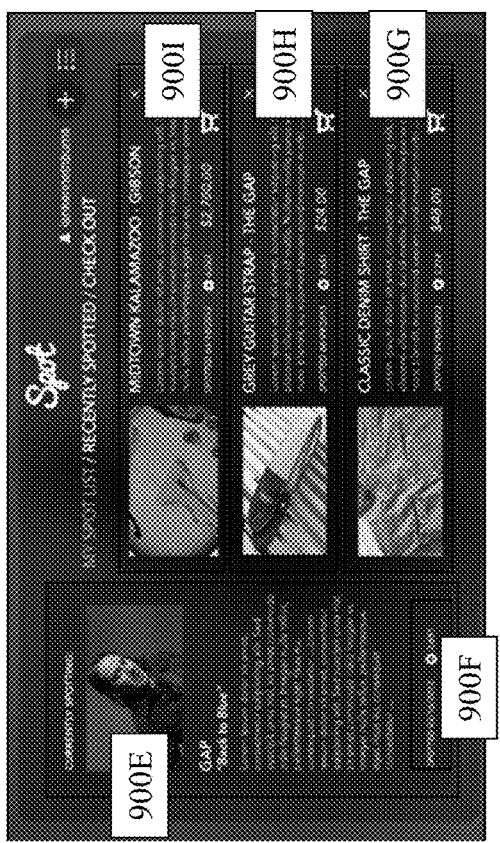

Referring to FIG. 9 there are depicted first to fourth screen images 900A to 900D relating to the subsequent retrieval of multiple hypermedia links selected by a user and associated with an item of multimedia content presented to the user according to an embodiment of the invention. Accordingly, there is depicted a first screen image 900A the user is selecting within the summary screen described supra in respect of fifth image 800E in FIG. 8. This triggers the display of a micro-website as depicted within second screen image 900B is then presented to them as depicted in zoom view in third screen image 900C. The elements displayed including:

Advertisement overview 900E, i.e. summary of the primary multimedia content they were viewing;

Data field 900F, including for example, the date the user played the primary multimedia content and selected the hypermedia link icon(s) together with a number of other users who have selected one or more hypermedia link icon(s) within the primary multimedia content;

First hypermedia link item 900G associated with the first hypermedia link icon selected by the user, in this instance one relating to a "Classic Denim Shirt" by The Gap™;

Second hypermedia link item 900H associated with the second hypermedia link icon selected by the user, in this instance one relating to a "Grey Guitar Strap" by The Gap™; and Third hypermedia link item 900I associated with the third hypermedia link icon selected by the user, in this instance one relating to a "Midtown Kalamazoo Guitar" by Gibson™.

As depicted in fourth screen image 900D certain summary information is presented in association with the displayed content associated with the first to third hypermedia link items 900G to 900I respectively. This, for example, as depicted being:

Image 900J of the hypermedia link item;

Count 900K of the hypermedia link item as selected by users overall;

Cost 900L of the hypermedia link item; and

Shopping Trolley 900M representing an online shopping portal element allowing the user to add the item to their shopping trolley for subsequent review and purchase during a checkout process as known to those of skill in the art.

The pricing information etc. may be provided, for example, by the advertiser in the instance of an advertisement, by a retailer in the instance of a retailer advertisement, or through the searching for a local stockiest of the item, based upon the user's selection, during the period of time they are finishing to watch the item of primary multimedia content, for example. In other instances, the primary multimedia content may be locally provided, citywide provided, statewide provided, nationally provided, or internationally provided. In these different instances the HCS-HCDAP upon receiving the indication of the user's selection of a hypermedia link icon and hence its associated hypermedia link item may determine the appropriate content to provide to the user within the subsequent displays, such as depicted in third and fourth screen images 900C and 900D, or it may provide specific elements such as the pricing, count, etc. and enable or disable the e-commerce features according to other information. For example, a US advertisement may include an item, e.g. a book, which is not available in Canada due to copyright issues for example. In this instance, the HCS-HCDAP identifying the viewer's location as Charlottetown, Prince Edward Island, Canada disables the Shopping Trolley 900M but enables it for a viewer in Portland, Me., USA. Alternatively, the HCS-HCDAP may identify that the item is out of stock/discontinued etc. with a retailer and adjust the image(s) presented to the user rather than the Shopping Trolley 900M.

Figure 10A:
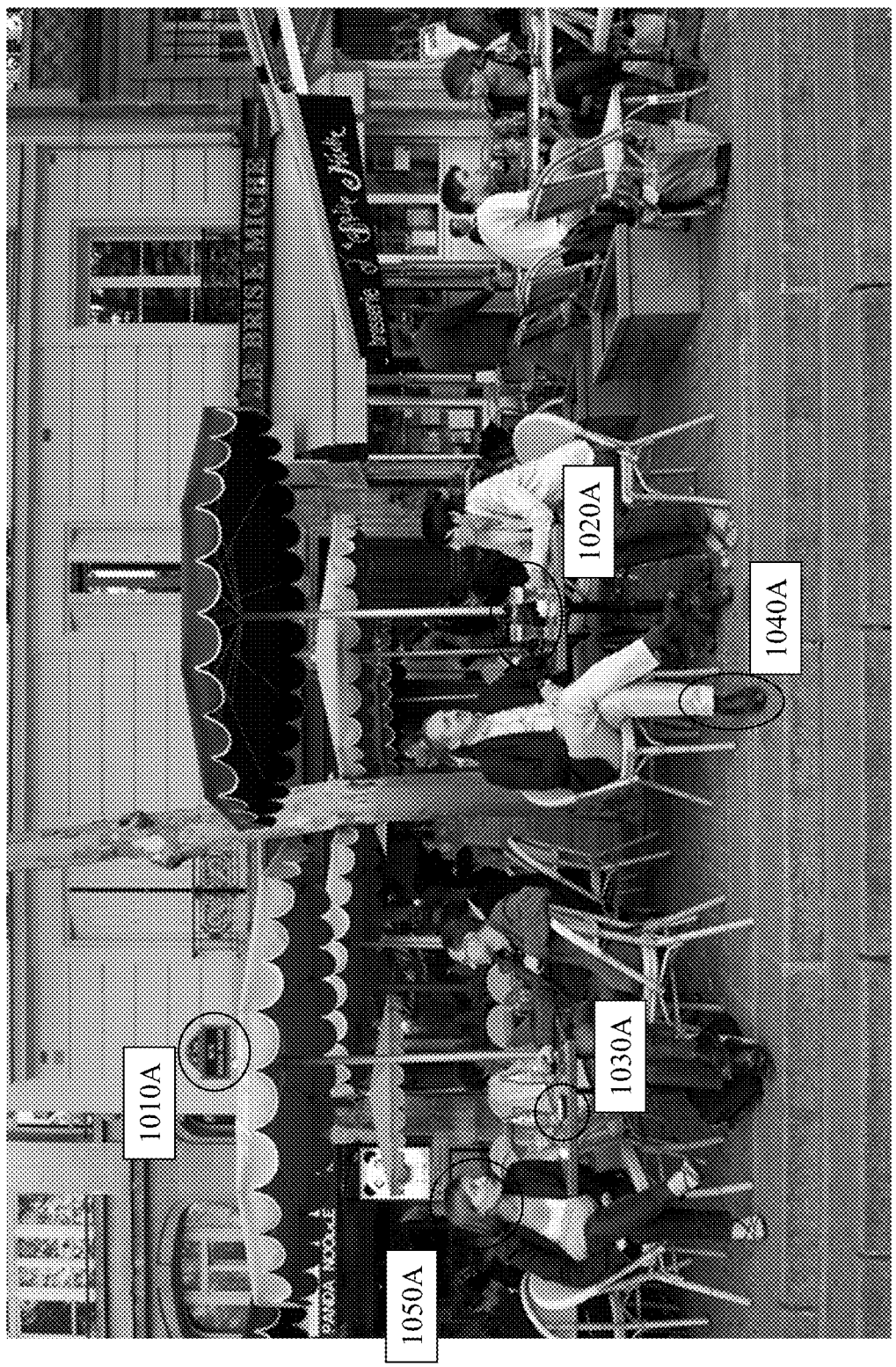
FIGS. 10A to 10F depict alternate notifications presented to a viewer in respect of hypermedia links within multimedia content presented to a user according to an embodiment of the invention.
Figure 10B:
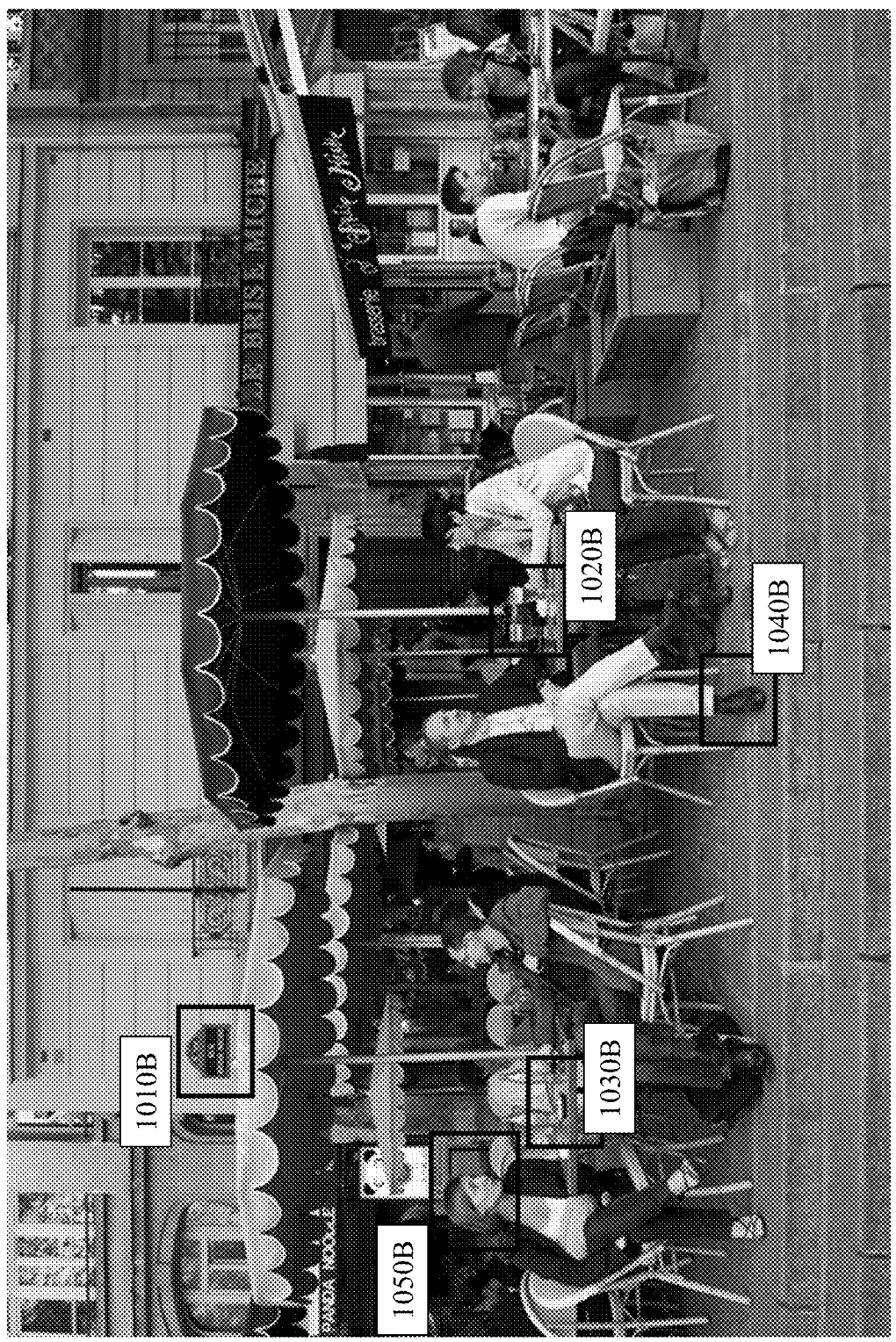
Figure 10C:
Figure 10D:
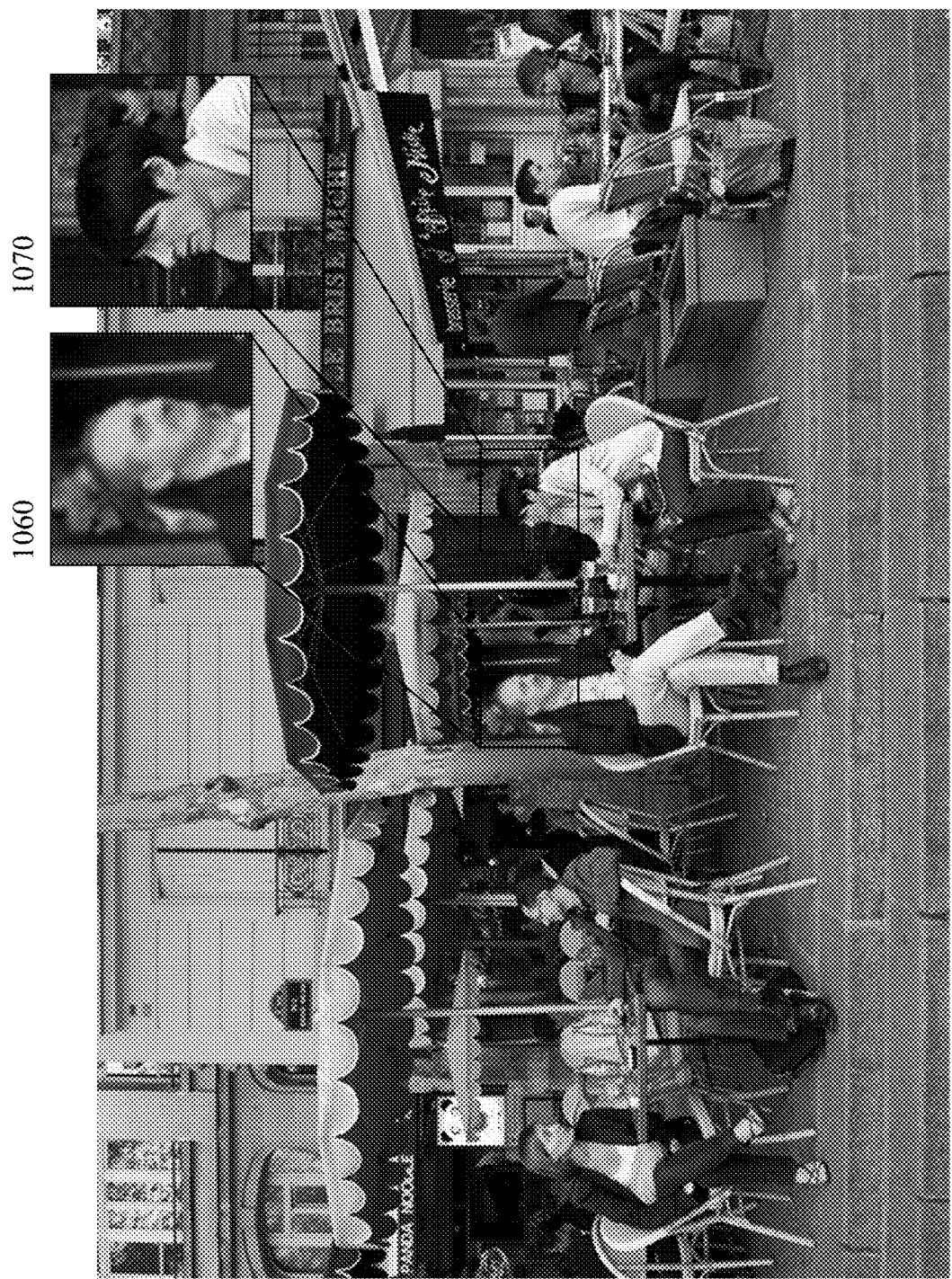
Figure 10E:
Figure 10F:

Now referring to FIGS. 10A to 10E there are depicted alternate notifications presented to a viewer in respect of hypermedia link icons within an item of multimedia content presented to a user according to an embodiment of the invention. In this instance, the image presented in each of FIG. 10A to 10F represents a paused multimedia presentation about French cafes set with a video segment of Rue Brisemiche located in the 4th arrondissement of Paris, France focusing at this point on "Le Jardin de The". Accordingly, there are depicted:

First screen image 1000A in FIG. 10A including first to fifth hypermedia link icons 1010A, 1020A, 1030A, 1040A, and 1050A exploiting the polygonal concept discussed supra in respect of FIGS. 3 to 9 wherein the border parameters and fill parameters of the hypermedia link icons are determined as discussed supra by factors including, but not limited to, viewer preference, primary multimedia content provider preferences, micro-website provider preferences, multimedia content, etc.;

Second screen image 1000B in FIG. 10B including first to fifth hypermedia link icons 1010B, 1020B, 1030B, 1040B, and 1050B exploiting "frosted" windows in a predetermined region around the hypermedia link icons;

Third screen image 1000C in FIG. 10C including first to fifth hypermedia link icons 1010C, 1020C, 1030C, 1040C, and 1050C but these are not displayed to the user although the user is advised there are 5 hypermedia link icons active wherein the user might pause the primary multimedia content seek the hypermedia link icons and then re-start viewing;

Fourth screen image 1000D in FIG. 10D including first to fifth hypermedia link icons 1010D, 1020D, 1030D, 1040D, and 1050D exploiting "blurred" windows in a predetermined region around the hypermedia link icons such as evident from blurred region 1060 relative to unblurred region 1070 in the inserts;

Fifth screen image 1000E in FIG. 10E including first to fifth hypermedia link icons 1010E, 1020E, 1030E, 1040E, and 1050E but these are not displayed to the user nor is the user advised of their presence encouraging those familiar with the HCS-HCDAP to find them such as may be employed in game scenarios, educational scenarios, etc.; and Sixth screen image 1000F in FIG. 10F including first to fifth hypermedia link icons 1010F, 1020F, 1030F, 1040F, and 1050F which are depicted as thumbnails at the bottom of the sixth screen image 1000F.

It would be evident that other methods may be employed and that in other embodiments of the invention thee may be used in combination such as, for example, an initial appearance such as depicted in sixth screen image 1000F followed by a brief display as first screen image 1000 A before returning to the format employed in sixth screen image 1000F or third screen image 1000C, for example.

Figure 11:
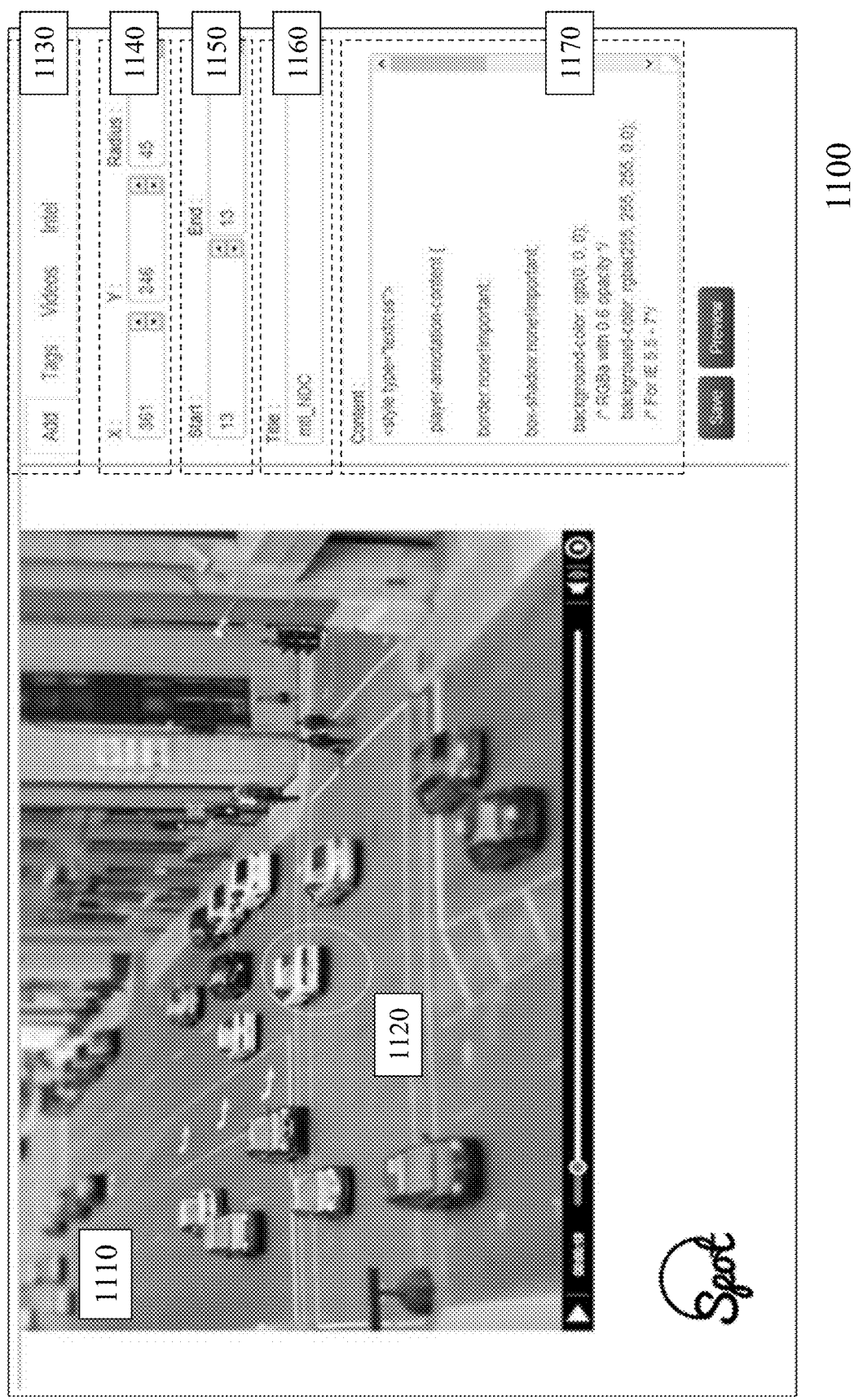
FIG. 11 depicts the establishment of a hypermedia link within multimedia content presented to a user according to an embodiment of the invention.

FIG. 11 depicts the establishment of a hypermedia link icon 1120 within multimedia content 1110 which will be subsequently presented to a user according to an embodiment of the invention. Accordingly, the user has adjacent to the multimedia content 1110 a series of entry field areas including, but not limited to:

First entry field 1130 wherein the user can select to add a new hypermedia link icon or edit tags associated with the primary multimedia content;

Second entry field 1140 wherein the user enters the coordinates and size of the hypermedia link icon (although it would be evident that in other embodiments of the invention they may select a format, dimensions, location, etc. as well as selecting element tracking for example);

Third entry field 1150 wherein the user defines timing information for the hypermedia link icon (although it would be evident that in other embodiments of the invention they may select appearance format, appearance timing, disappearance format, disappearance timing, etc., for example);

Fourth entry field 1160 wherein the user may associate a title to the hypermedia link icon; and Fifth entry field 1170, wherein the user associates the micro-website/secondary multimedia content information to the hypermedia link icon.

Optionally, the user may access stored hypermedia link icons and search/filter/select/edit based upon searching for title, format, secondary multimedia content etc. such that generation times may be reduced. Within another embodiment of the invention a thumbnail or other acquired image relating to the element to which the hypermedia link icon is associated is stored within a database allowing subsequently the HCS-HCDAP editor 1100 to automatically identify and offer insertion of hypermedia link icons and their associated micro-website and/or secondary multimedia content.

Figure 12:
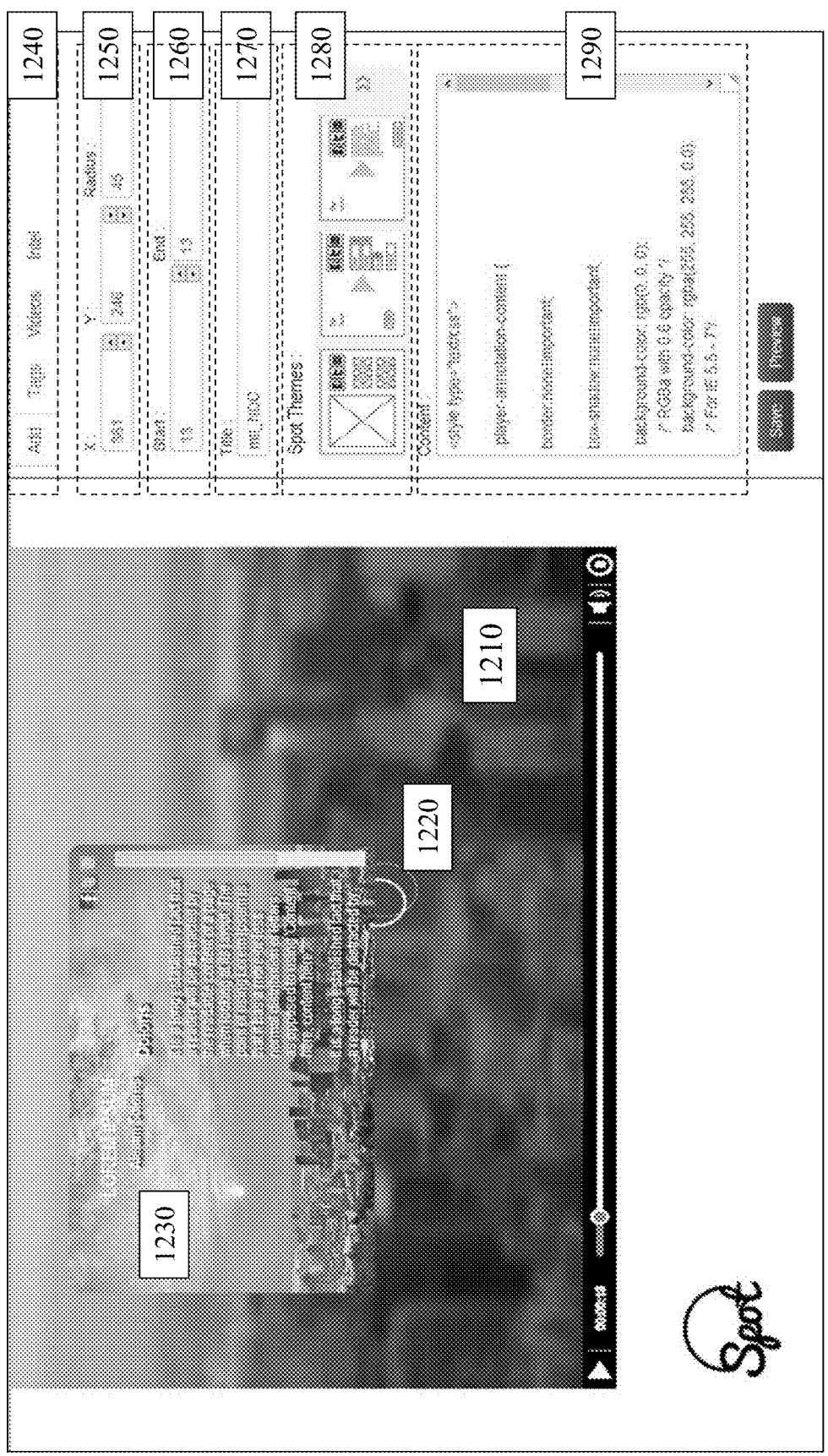
FIG. 12 depicts the establishment of a hypermedia link within multimedia content presented to a user according to an embodiment of the invention.

FIG. 12 depicts the establishment of a hypermedia link icon 1220 within multimedia content 1210 which will be subsequently presented to a user according to an embodiment of the invention and its associated micro-website 1230 and associated secondary content. Accordingly, a user is employing a HCS-HCDAP editor 1200. Accordingly, the user has adjacent to the multimedia content 1210 a series of entry field areas including, but not limited to:

First entry field 1240 wherein the user can select to add a new hypermedia link icon, edit tags, search/add/associated secondary multimedia content with the micro-website 1230 generated by the user's selection of the hypermedia link icon 1220, or add analytics etc. through the "INTELLIGENCE" tab;

Second entry field 1250 wherein the user enters the coordinates and size of the hypermedia link icon (although it would be evident that in other embodiments of the invention they may select a format, dimensions, location, etc. as well as selecting element tracking for example);

Third entry field 1260 wherein the user defines timing information for the hypermedia link icon (although it would be evident that in other embodiments of the invention they may select appearance format, appearance timing, disappearance format, disappearance timing, etc., for example);

Fourth entry field 1270 wherein the user may associate a title to the hypermedia link icon;

Fifth entry field 1280, wherein the user may select a theme for structuring the micro-website/secondary multimedia content information associated to the hypermedia link icon; and Sixth entry field 1290 the user associates the micro-website/secondary multimedia content information to the hypermedia link icon.

It would be evident to one skilled in the art that the themes for structuring the micro-website/secondary multimedia content information provided to the user 1280 may range from blank structured templates providing the user with the requirement to fill all fields appropriate or may be pre-structured partially completed templates such as in the instance of a large enterprise, e.g. PepsiCo, Cisco, Apple, etc. such that core common information such as branding, social media links, etc. are already established for the user. Optionally, the themes selectable in fifth entry field 1280 may be associated with the HCS-HCDAP editor 1200 whilst within other embodiments of the invention they may be associated with a third party web editor, third party web publishing tool, etc.

Accordingly, it would be evident that embodiments of the invention exploiting HCS-HCDAPs provide viewers (consumers) of multimedia content with feature rich multimedia content unlike the current flat non-interactive multimedia content, e.g. video, currently provided to users. Accordingly, a user can perform additional research, purchase, store and link content, and obtain further information without leaving the multimedia content nor the website/webpage/application that they are currently viewing and/or accessing the multimedia content within. Accordingly, as described embodiments of the invention exploiting HCS-HCDAPs provide interactivity by embedding flexible and traceable micro-websites inside primary multimedia content. The embedded micro-websites via the infrastructure of web content, e.g.

HTML frames, can be re-distributed and shared wherein all the micro-website features and secondary multimedia content links are maintained.

Embodiments of the invention within HCS-HCDAPs allow the micro-websites and their associated hypermedia links and hypermedia link icons, to be highly compatible across platforms, and require a small data loading allowing HCS-HCDAP multimedia content to be shared and distributed easily without the necessity of special applications or downloads. Accordingly, HCS-HCDAP multimedia content and its associated micro-websites leverage low complexity web frameworks as their basis allowing the data is broadly compatible on multiple operating systems, devices, applications, etc. and that consumer/user/viewer ease of use is at a high level in every rendered element of HCS-HCDAP multimedia content.

The HCS-HCDAP technology is, within an embodiment of the invention implemented exploiting a layering of data in one or more layers onto a layer (or layers) of multimedia content and allowing the layers interact with one another. Accordingly, in one embodiment, the primary multimedia content distributed within the HCS-HCDAP framework comprises two layers "accessible" to the user/viewer. The first of these two layers of data is the primary multimedia content itself, Layer 1, and the second is the hypermedia link icon(s), Layer 2. As noted supra the hypermedia link icon(s) may be visible, invisible, etc. according to the settings established by the generator of the published primary multimedia content with the HCS-HCDAP features. These two layers, Layer 1 and Layer 2, are linked together based upon a set of parameters, including, but not limited to, the coordinates of a hypermedia link icon(s), the design/size of the hypermedia link icon(s), the timing information of the hypermedia link icon(s), and the identity of the respective layer(s) bound. In this manner, a hypermedia link icon can be associated with a specific element within the primary multimedia content, e.g. visual element. In other embodiments of the invention this linking may be more complex allowing elements with varying location during the timing the hypermedia link icon is present to be tracked and linked.

When a hypermedia link icon is selected, the HCS-HCDAP may, according to an embodiment of the invention pause the primary multimedia content and within the multimedia content open a third layer, Layer 3, which provides the micro-website and therein the secondary multimedia content, social media links, navigation features, etc., such as described supra in respect of FIGS. 3 to 10 respectively. Alternatively, the action is logged, the primary multimedia content continues and no additional layers are opened until a predetermined point later. Such an alternative being as depicted in FIGS. 8 and 9. Optionally, the micro-website may be minimal and merely present an item of secondary multimedia content or it may be feature rich allowing presentation of additional information/content, social media posting by the user, and purchasing of an item, for example. Within other embodiments of the invention the primary multimedia content is not paused but may, for example, continue playing, go back to a predetermined point, go forward to a predetermined point, or go to a predetermined point based upon the action(s) of the user within the micro-website. The dimensions and location of the micro-website may be established by the user of the HCS-HCDAP system generating the primary multimedia content with the micro-website/hypermedia link icon features. Accordingly, the micro-website is within embodiments of the invention a fully functional, customizable, and independent micro-website. Within this window data can be navigated, tasks performed, images viewed, links accessed, etc. Further, engagement with a micro-website is fully traceable and analyzable allowing user action(s) such as hypermedia link icon selection to be tracked allowing analytics and other functions to be provided. Accordingly, a music video may provide hypermedia link icons to elements within and the music video producer publishing it with HCS-HCDAP features may receive revenue from per-click style activity of viewers engaging, for example, one or more elements with hypermedia link icons. Other hypermedia link icons within the music video may simply link to the musicians, an order page for the music or a collection it is part of Per-click revenue may be based upon simple selection and/or conversion etc. as known within the prior art. Content producers may then receive more complex data and analytics other than the item was accessed and/or played.

Within some embodiments of the invention an additional layer may be provided allowing the user to toggle on/off visibility of the hypermedia link icons within the HCS-HCDAP published primary multimedia content. Accordingly, this layer, Layer 4 for example, may further allow the content on Layer 3 to be paused and hidden rather than closed allowing the user to return to the original Layer 1 content and then back to Layer 3 without having to re-navigate/replay elements within the Layer 3 again. A viewer plug-in may be provided in instances where a native viewer does not support all or some of the HCS-HCDAP features. In this manner, a viewer can turn on the hypermedia link icon display, i.e. Layer 2, and by clicking on the hypermedia link icons still opens their associated micro-websites, i.e. Layer 3, or they can turn off the hypermedia link icons, if displayed by default, such that they are able to watch the primary multimedia content as usual but can select what they are interest in and see whether there is an associated hypermedia link icon and hence element(s) to be displayed to them. In other embodiments of the invention such actions that do not trigger hypermedia link icons may also be tracked allowing the content provider to establish additional data and/or modify other analytics. For example, Audi™ may release an advertisement for their new vehicle, such as depicted in FIGS. 6 and 7 for example, and find from the collected data that more viewers tapped the radio in background and/or "Stronic" text than selected the hypermedia link icon 650 during the portion of the advertisement represented by fourth and fifth screen images 600D and 600E respectively when the hypermedia link icons very invisible or even when they were visible. Optionally, Layer 2 may be split into two or more layers allowing different levels of hypermedia link icon display which can be toggled on/off, made inactive or active, etc.

A HCS-HCDAP editor, such as depicted in FIGS. 11 and 12 respectively, may be installed by a user, third party, etc. or alternatively it may be a cloud based HCS-HCDAP editor. The HCS-HCDAP editor is a content management system (CMS) and/or web editing tool set (WETS) allowing a user to access the primary multimedia content and perform the steps of associating hypermedia link icons to the primary multimedia content and the secondary multimedia content within the resulting displayed micro-websites displayed. In common with other CMSAVETS the HCS-HCDAP editor may be provided at different complexities and/or have features that are locked/unlocked based upon a subscription/key of the user. In this manner an initial HCS-HCDAP editor may simply provide features where a limited number of layers are provided to the user whilst in other instantiations of the HCS-HCDAP editor may provide advanced and/or extended functionalities allowing a user to work upon multiple layers and manage hypermedia link icons on several layers allowing the publishing/release of content with different options/functionality either based upon viewer capabilities or viewer subscription level, for example.

Users of a HCS-HCDAP editor according to an embodiment of the invention once ready to publish may be required to enter an embed code in order to combine the primary multimedia content, secondary multimedia content, layers etc. This embed code may be employed as a mechanism to allow analytics even where the primary multimedia content is shared/re-distributed. The user may within the HCS-HCDAP editor view, edit, and manage any primary multimedia content, secondary multimedia content, layers etc. as well as exploit other dashboards to access and exploit engagement data and/or analytics. Optionally, the HCS-HCDAP editor may be part of a suite wherein analytics etc. are accessible to users through other cloud based or installed software elements rather than within the HCS-HCDAP editor directly. Within other embodiments of the invention full and limited function HCS-HCDAP editors may be provided allowing some users to view the HCS-HCDAP feature primary multimedia content whilst enabling or disabling layers to see how the primary multimedia content presents whilst others provide full editing functionalities allowing the content addressees, content structure, layers, and associated organizational code(s) (e.g. HTML and CSS) to be viewed, added, edited, deleted, etc.

It would be evident to one skilled in the art the embodiments of the invention allow for multiple types and/or levels of functionality to be integrated into multimedia content with their functional code residing within the HCS-HCDAP layers/windows. Additionally, due to the structure of the HCS-HCDAP systems, platforms, software etc. users are able to embed and add other functionality to their portfolio of options using third party plug-ins such as e-commerce functionality for example. Accordingly, an advertiser may distribute a shareable advertisement supporting direct purchasing/monetization options for the viewer through the HCS-HCDAP features. Accordingly, an element of multimedia content may go viral with every view representing an optionally accessible digital storefront. Full commercial conversions may be achieved directly within primary multimedia content using the HCS-HCDAP platform according to embodiments of the invention.

Further, as the resulting published multimedia content is sharable, the combined implications illustrate an opportunity to host full transactions on third party websites and through social media channels, running through the HCS-HCDAP enhanced multimedia. Further, compatibility with third party e-commerce plugins such as Shopify™ and GoDaddy™ allow the HCS-HCDAP enabled multimedia to leverage and benefit from infrastructure and security already in place, as well as gain access to wider e-commerce markets.

A HCS-HCDAP according to embodiments of the invention provides a CMS/editor toolset which may, for example, in a cloud based system be accessed using user credentials and security credentials. Accordingly, when a client enters the cloud suite they are able to upload multimedia content and embed hypermedia link icons by clicking on elements they see (in the same way the end users will later access the embedded hypermedia link icons). When a hypermedia link icon is embedded, a user is able to populate it. In some embodiments of the invention this may be performed using an editor in a similar manner to which a website is built by choosing a template and uploading content to populate it. In some embodiments of the invention a micro-website template may be established through the selection of a standard website template from a third party provider or as an option within the HCS-HCDAP software. From that point, the user can move on to embed more spots into the video or can release it publicly. When a user produces an interactive HCS-HCDAP feature enhanced multimedia content they are, within a cloud based environment, provided with a Uniform Resource Locator and an embed code which they can then distribute wherever they like, on their websites, blogs, and though social media etc.

Within the HCS-HCDAP CMS according to embodiments of the invention a user is able to access and manage all previously built HCS-HCDAP enabled multimedia content by navigating using tools known within the art. By selecting any HCS-HCDAP enabled multimedia content, the user is able to edit and update secondary multimedia content in each micro-website associated with a hypermedia link icon much in the same way as administrating a website. Beneficially users are able to update their HCS-HCDAP enabled multimedia content at any time and have the changes replicate through every channel where the HCS-HCDAP enabled multimedia content has been shared/distributed within the cloud based distribution.

It would be evident that amongst the plethora of applications e-learning represents one subset of the available applications and markets. However, unlike prior art solutions HCS-HCDAP enabled multimedia content allows people to drill down on details and carve out their own direction as well as bookmark, save, tag content etc. and share with others. Accordingly, the technology according to embodiments of the invention allows its user to build high level presentations or tours while embedding detail behind concepts and allowing the viewers to drill down on specific concepts important to them. For example, a 40-minute demonstration video or lecture video may be reduced to an initial 5-minute segment such that based upon the different selections of the viewers through the hypermedia link icons may vary from the 5 minutes through to full 40-minute viewing although the user may progress at their own pace, go back, leap forward, etc. as they wish. Further, different secondary multimedia content can even be embedded to suit different learning styles creating a customized learning solution for each student, all while maintaining a common technological backbone and common material set.

As noted supra in respect of embodiments of the invention users have the ability to embed direct sales channels inside online primary multimedia content. This is accomplished by structuring the primary multimedia content to support a full micro-website being embedded within it, linked to the primary multimedia content. In building this structure, HCS-HCDAP has been able to achieve an arrangement whereby a user can click an item seen within the primary multimedia content, open a micro-website within the primary multimedia content over top of the primary multimedia content, and perform a complete transaction. The value of this feature is that buyers are not required to navigate out of the primary multimedia content, to either the advertiser's website or third party website to complete the transaction, thereby eliminating several steps between the user's engagement and their completion of a purchase for example. It also means that users are able to perform transactions at multiple locations on the web from a single point. Clients can place their digital storefronts throughout the Internet, through the process of distributing their media marketing campaigns, and such digital storefronts are immediately accessible to the viewer upon their selection of a hypermedia link icon.

Beneficially, as the hypermedia link icons trigger micro-websites on additional layers the HCS-HCDAP allows for establishing and exploiting market intelligence dashboards and engagement analytics. Each hypermedia linked micro-website is engineered according to embodiments of the invention to provide equivalent basic functionality of a website, including being identified by a URL. Accordingly, embodiments of the invention allow the same tools that can be used for measuring Search Engine Optimization to be employed to track aspects of the hypermedia link click-through rates as well as tracking the activities performed inside each micro-website.

Components of an Exemplary System

Figure 13:
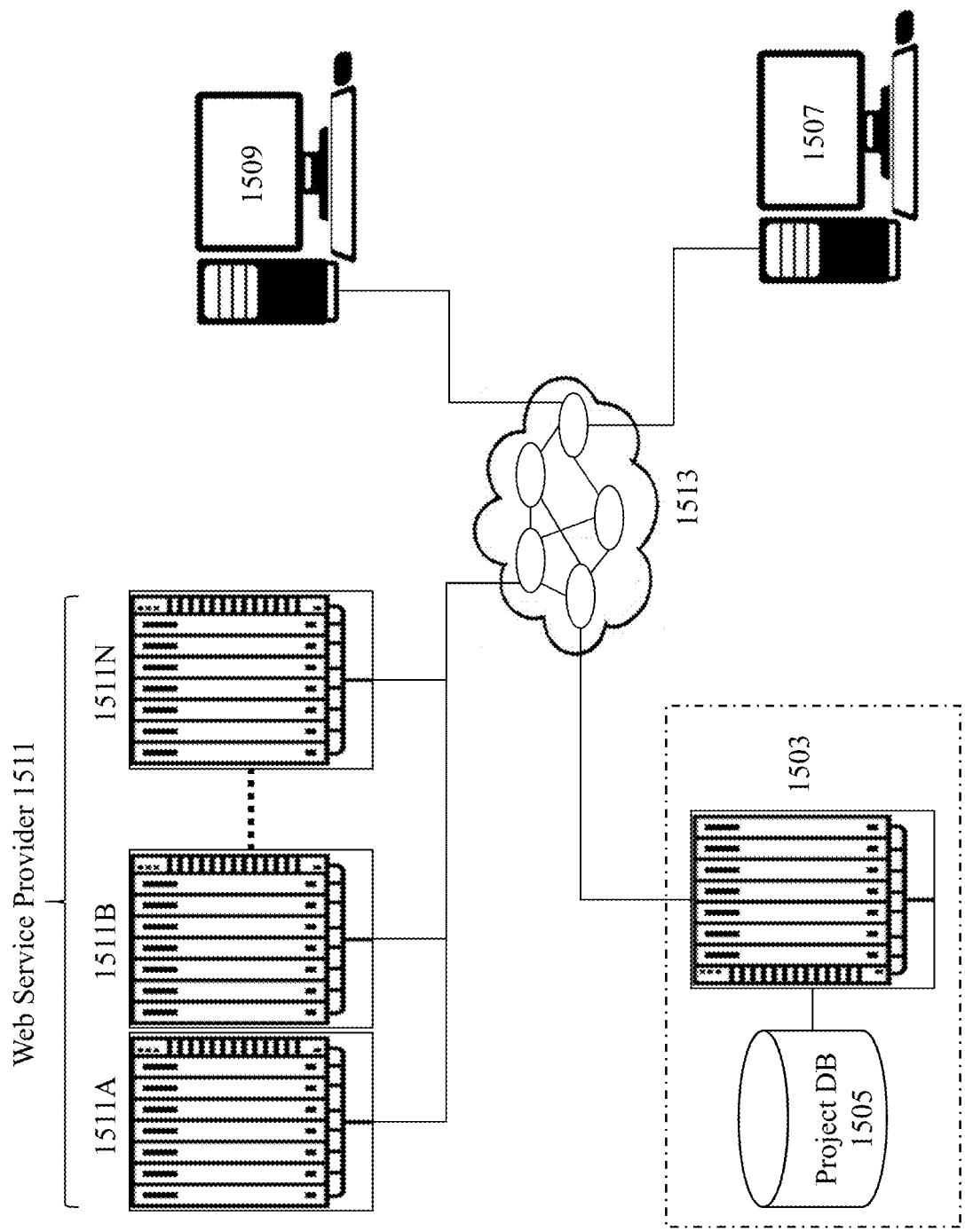
FIG. 13 shows components of an exemplary system providing interactive media development and distribution, according to an exemplary embodiment.

FIG. 13 shows components of an exemplary system 1500 providing interactive media development and distribution, according to an exemplary embodiment. In the exemplary system 1500, a media content service 1501 may host a web-based media development environment on one or more development servers 1503, which are accessible over one or more networks 1513 to designer computers 1507 operated by users who are designing interactive media content. The development servers 1503 may store elements of media projects into project records of a project database 1505. The development servers 1503 may compile the design elements of a particular media project into an interactive media file. The development servers 1503 may then distribute the interactive media file to one or more destination devices, such as a web service server 1511A-c or an end-user device 1509, over the one or more networks 1513.

Media Content Service

In the exemplary system 1500, a media content service 1501 may comprise any number of development servers 1503 and any number of project databases 1505. The media content service 1501 may provide web-based services for generating and distributing interactive media files, which may be machine-readable software modules containing interactive content to be presented to end-user devices 1509 through, say, webpages or social media outlets hosted by various web service providers 1511.

Development Server

A development server 1503 may be a computing device configured to host a web-based software application for generating interactive media files, and/or software modules for distributing interactive media files to any number of destination devices via computing networks 1513. Although the exemplary system 1500 is shown in FIG. 1500 as having just one development server 1503, it should be appreciated that the system 1500 may comprise any number of development servers 1503. It should also be appreciated that the development server 1503 may be any computing device comprising a processor capable of being configured to execute one or more of the various tasks and processes described herein.

Development Platform

The development server 1503 may comprise a webserver software program (e.g., Apache®, Microsoft IIS®) configured to host a web-based software application ("development platform") for developing and designing an interactive media file, by manipulating logical layers of computing files and programmatic code to be complied into an interactive media file. In other words, each of the layers may comprise computing files or programming providing the functional and/or aesthetic design elements of the interactive media file. The development platform application may generate and interact with various browser-based graphical user interfaces presented to a designer device 1507. In some embodiments, the development application may include a WYSWIG editor function used to configure the functional and aesthetic design elements of the interactive media file.

In such embodiments, the development platform application may automatically generate software code for each layer of the interactive media file, based upon the designer's inputs into the graphical user interface of the web-based software application. Additionally or alternatively, the designer device 1507 may transmit to the developer server 1507 various files, data, software coding scripts, and other selection inputs, to configure functional and aesthetic design elements of the interactive media file.

The interactive media file may be developed by compiling a plurality of logical layers comprising programmatic code, files, or data. Each layer may be a self-contain subset of programmatic code, such as an iFrame, Flash® player, or HTML5 container element, instructing the web browser on webpage functionality. Through the design web-based application, a designer device 1507 may provide inputs that construct each particular layer's functions and aesthetics. Inputs may include machine-readable pointers to particular design elements the designer wants to include, at a given layer of an ongoing media project, prior to compiling the design elements together to form the interactive media file. In some cases, a pointer may be a resource locator string pointing the web browser to a particular file directory where a file, such as a media file, is stored; thereby allowing the designer device 1507 to upload the file to the development server 1503, and then stored into the project database 1505. In some cases, the pointer may be a uniform resource locator (URL) to a media container, file, or other element hosted or otherwise stored on a provider server 1511A to 1511N, of a web service provider 1511.

For example, at a media layer may comprise an iFrame that hosts a YouTube® video the designer wants to include in the interactive media file. Alternatively, the designer may upload a video to the web-based application, which may be embedded or converted into an HTML5 container element or a Flash® player. In this example, the designer may input into a selection field a URL pointing to a YouTube® video hosted on a YouTube® server 1511A. The URL pointer may be stored into the project database 1505, and thus each time the project is reviewed and manipulated by the designer, the development server 1503 may retrieve the linked YouTube® video from the YouTube® server 1511A and display it at a media layer of the ongoing media project. In the alternative examples, the development server 1503 may be configured to receive an uploaded media file from a designer device 1507, store the media file into a project database 1505, and/or convert the media file into a Flash®-playable file or embed the media file into an HTML5 element.

In configuring the functional aspects of the interactive media file, the development server 1503 may allow a designer to input selections configuring canvas files that are logically layered overtop the media file. Each canvas file may be a web-based design element, such as an HTML5 container, comprising discrete programming code. In some embodiments, the development server 1503 may function as a WYSIWYG code editor for the canvas file, automatically generating the code for the canvas file based upon the designer's inputs into the graphical user interface; a designer may also be able to manually generate or other manipulate the code underlying the canvas file. The canvas file may be stored into the project database 1505, in the project record identified by the project identifier for the ongoing media project. The programmatic code of each respective canvas layer ultimately provides the functional aspects of the interactive media file, once the interactive media file is compiled by the development server 1503. That is, after the designer has instructed the development server 1503 to generate one or more canvas files to overlay onto the selected media file, the designer may instruct the development server 1503 to generate the interactive media file using the design elements (e.g., media file, canvas files) associated with the project identifier, stored in the project database 1505. The development server 1503 may then compile programmatic code of the design elements associated with the media project, to generate the machine-readable software code of the interactive media file.

The development server 1503 may generate, host, update, and distribute a media player software module ("media player") configured to interpret, playback, and interact with the interactive media file. More specifically, the media player may be a computer program configured to interpret and interact with the underlying software code of the interactive media file. When the interactive media file is accessed by an end-user computer 1509, via a web service provider 1511, the software code of the interactive media file is interpreted by the media player instance hosted on the particular provider server 1151*a*. In operation, the media player may playback the media of the interactive media file and deliver the functional design elements to the end-user computer 1509, all within a self-contained environment, embedded within the host webpage.

For example, similar to conventional embedded web-based functions, such as YouTube® videos, the development server 1503 may generate a code or link that fetches the media from a third-party source, which allows the browser to view a current website and access the various features from the third-party source, on the current website. The designer may, for instance, embed a hyperlink in a social media webpage hosted on a social media server 1151*b* (e.g., Facebook®). When the browser of the end-user computer 1509 activates the link, the social media server 1151*b* may load a media player from the development server 1503 and the programmatic code within the iFrames of the interactive media file will pull in all of the functional assets from third party web service providers 1511 or the project database 1505. But unlike conventional embedded web-functions, the development server 1503 may generate any number of embed codes for each layer of the interactive media file, each of which call to media asset and/or additional web content (e.g., websites, web-based applications). The designer is therefore not required to generate software code for the various layers, and the server hosting the media player is not required to pull content from multiples sites. In the event the end-user interacts with the interactive media file, there is no requirement for the web browser of the end-user computer 1509 to be directed to a new webpage, tab, or window—all interactions with the interactive media file, including re-directs to a new URL for a third-party's website, may be contained within the boundaries of the media player displaying the interactive media file on the current website.

Project Database

The content media service 1501 may comprise a project database 1505 that stores ongoing and completed media projects in media project records. The project database 1505 may be hosted on any number of servers comprising non-transitory machine-readable storage media and processors configured to execute the various tasks and processes described herein. The project database 1505 may be coupled to the development server 1503 and may query, fetch, store, and update media records based on the instructions of the development server 1503. In operation, media project records of the project database 1505 may be identified by the design platform application according to a project identifier value, associated with the ongoing media project or interactive media file. As new files and design elements are uploaded or generated, the files may be stored into the project media record for the respective media project and, in some cases, may be associated with the project identifier.

In addition, a development server 1503 may generate and distribute an embed code or hyperlink string (i.e., URL) that is associated with a compiled interactive media file compiled from the data and files stored in the record of a media project record. When activated or requested by a web provider server 1511A to 1511N or an end-user device 1509, the webserver modules or application modules of the development server 1503 may reference the project database 1505 to retrieve and provide the interactive media file identified by the embed code or hyperlink. The project database 1505 may query and fetch the interactive media file having the particular embed code or hyperlink.

Web Services

Web service providers 1511 may be entities hosting content, web-based applications or data that is accessible over the Internet, and may include a merchant website (e.g., Amazon®, Audi®, Expedia®), a provider of web-based media content (e.g., Instagram®, Vimeo®, YouTube®, CBS®, ESPN®), or a provider of web-based or cloud services (e.g., PayPal®, Google Drive®, Evernote®, OpenTable®, Facebook®, LinkedIn®). Each particular product or service offering may be hosted on a provider server 1511 to 1511N, accessible to a development server 1503, designer devices 1507, and end-user devices 1509, over one or more networks 1513.

The exemplary system 1500 may comprise any number of provide servers 1511A to 1511N. Provider servers 1511A may be any computing device comprising a processor executing software modules configured to host a web-based software application or website, and provide the particular service offering or product to devices of the system 1500, such as end-user devices 1509. In some instances, provider servers 1511A to 1511N may publish application programming interfaces (APIs), which may be programmatic code modules allowing computing devices like the development server 1503, or software modules like an interactive media file and a media player, to communicate data values or instructions with the provider servers 1151A to 1511N. In order to exchange data values and/or instructions with one or more provider servers 1511A to 1511N coupled to the system 1500, the development server 1503 may generate a canvas file comprising programmatic code that when compiled into the interactive media file, configures the interactive media file to communicate using the respective APIs of the respective provider servers 1511A to 1511N.

As an example, a designer may use the designer application hosted on the development server 1503 to generate a canvas file on an interactive canvas layer overtop a media file. The development server 1503 may generate an embed code for a hyperlink that references the media interactive file in the project database 1505. In this example, after compiling and generating the interactive media file, the designer or an end-user may embed a media player of the media content service 1501 onto a webpage, where the media player is configured to retrieve and playback the interactive media file according to the embed code. Alternatively, the embed code may be provided to the designer or end-user, who may include the embed code into the programmatic code of his or her webpage or computer application hosted on a provider server 1511A to 1511N. For instance, the end-user or designer may enter the embed code as a social media posting, thereby instructing the social media provider server 1151*b* to fetch the media player and the interactive media file from the development server 1503, according to the APIs of the social media provider server 1511B.

User Computing Devices

A system 1500 may comprise any number of client computing devices, such as designer devices 1507 and end-user devices 1509. Client computing devices 1507, 1509 may be any computing device comprising a processor capable of executing the various tasks and processes described herein. Non-limiting examples of client computing devices 1507, 1509 may include workstation computers, laptop computers, server computers, tablets, mobiles devices, and the like.

A designer device 1507 may be a computing device used by a designer who is working on a media project to generate an interactive media file. In order for the designer to create the media project, the designer device 1507 accesses via one or more networks 1513 a development platform web-application hosted on a development server 1503. A web browser application of the designer device 1507 exchanges data values and instructions with the development platform application, based on the inputs provided by the designer when interacting the user interfaces generated by the development platform and presented through the web browser. In some circumstances, the designer device 1507 may access a provider server 1511A to 1511N to retrieve files, pointers, or other programmatic code (e.g., APIs), which may then be provided to the development platform application for integration into one or more layers of an ongoing media project. The designer device 1507 may also be provided with an embed code or hyperlink, resulting from the development server 1503 compiling and generating the interactive media file. The designer device 1507 may then include the embed code or hyperlink into programmatic code hosted on a provider server 1151A to 1511N.

An end-user device 1509 may be any computing device comprising a web browser capable of accessing a provider server 1511A to 1511N hosting a web-based application, computing service, or any other form of website having a remote call (e.g., embed code, hyperlink URL) to an interactive media file and media player of a media content service 1501. In some cases, the end-user device 1509 may access a particular webpage hosted by a provider server 1511A to 1511N, and then, while accessing the page, activate a hyperlink, or enter some other input into a user interface, instructing the provider server 1151A to 1511N to request the interactive media file and media player from the development server 1503. In such cases, the development server 1503 may transmit the media player and the interactive media file identified by an embed code or hyperlink transmitted to the development server 1503 from the provider server 1511A to 1511N, when the end-user activated the remote call. The end-user device 1509 may then interact with interactive media file, as though it is a self-contained software application, without leaving the current webpage. In other words, the end-user device 1509 may view and interact with the media player and the interactive media file hosted on the website of a first provider server 1511A, while the underlying media code of the interactive media file allows the end-user device 1509 to communicate directly with various computing services and interfaces of a second provider server 1511B, as received through the media play and the interactive media file.

Exemplary Methods

FIG. 14 shows execution of an exemplary method 1600 of generating a new interactive media project that may be distributed to any number of devices, according to an exemplary embodiment. The exemplary method 1600 shows steps 1602, 1604, 1606, and 1608, but it should be appreciated that other embodiments may omit one or more steps, or may include additional or alternative steps. A development server may host a development platform application that a designer may access using a designer device, to configure, generate, distribute, and update an interactive media file. In some embodiments, the development server hosting the development platform application may generate a new project record for a new media project, when the designer selects to begin a new media project. Records of media projects may be stored into a project database, and are retrievable by any number of devices, such as the development server, according to a project identifier value, among other possible embed codes or hyperlinks.

In a first step 1602, a development server hosting a development application receives a pointer to a media file for a media layer, of an interactive media file. In some instances, the pointer may be a URL or embed code to a video hosted at third-party server, such as YouTube® or Vimeo®. The development server may retrieve the media file and display the media file in a web-based code container, such as an iFrame, on a palette interface of the development application, allowing the designer to interact with the media file. In some instances, the pointer entered by a user into a graphical user interface, on the client-side, may be a file directory pointer, instructing the web browser of the end-user device to upload a media file identified by the particular file directory pointer. The development server may store the media layer as programmatic code into the record of the project. The development server may also store the media file into the record of the media project, when the media file is locally accessible to the development server. The programmatic code of the media layer may comprise code making remote calls to remote media files, such as YouTube® videos, or may comprise code making calls to a media file stored in the project database.

In a next step 1604, the development server may generate a first canvas file based on the dimensions of the media file. In this step, a user may request the development platform application to prepare the interactive canvas file to lie over to of the media file. The development server may automatically detect the dimensions of the media file and then generate a container, such as an iFrame, for programmatic code. The programmatic code of the first canvas file contains the functional and aesthetic design elements of the first canvas layer to be overlaid on the media layer, and may execute various interactive functions and/or access third-party sources. The development server may synchronize the timing of the first canvas file's interactive options and the media file, such that the canvas layer and media layer are appropriately synchronized when presented. The internal mapping coordinates of the first canvas file and the media file may be aligned, such that the designer may include certain design elements into the canvas file to visually sit over top a particular location of the media file. As a result, design elements introduced at the first canvas layer will be predictably displayed overtop a desired location of the media layer. The first canvas layer may include interactivity functions and options, including, but not limited, those functions and features described in the exemplary embodiments of FIGS. 2-14.

In some cases, the development server may store the first canvas file, the design elements, machine-readable files, data, or other additional inputs for the canvas file into the project database.

In a next step 1606, the development server may generate a second canvas file comprising programmatic code for a second canvas layer, which may overlay on top of the first canvas file and the media file. The second canvas file may be a container for programmatic code, such as an iFrame, configured to execute various functions and/or access third-party sources for data. The canvas file may present interactive interfaces that are visually presented as an interactive user interface, overtop the media file. When the user interacts with the first canvas file, the second canvas file may then provide additional user interface functions, which may be based upon selections available in the first canvas file.

For example, a first canvas file may comprise code instructing the interactive media file to present a second canvas file linked to the selection in the first canvas file. In this example, the media file may present an image of a car, which has a first canvas file that allows the user to select, say, pixels of a tire portion of the car. The first canvas file may then present a second canvas file displaying, say, a mobile version of a tire purchasing website or abridged applet or widget of the tire purchasing website. The programmatic code of the second canvas file may facilitate data communications between the end-user device and a third-party service provider's server, such as the tire purchasing website in this example.

In some cases, the development server may store the second canvas file, the design elements, machine-readable files, data, or other additional inputs for the second canvas file into the project database.

In a next step 1608, the development server may compile the media file, first canvas file, and second canvas file, into the code of the interactive media file. In this step, the developer server may fetch the files stored in the media project record having the project identifier. The development server may then generate the code of the interactive media file, having a file format that may be consumed by a compatible media player associated with the media content service hosting the development platform. At compilation, the development server may generate an embed code or hyperlink that directs the development server to the project record containing the interactive media file.

FIG. 15 shows execution of an exemplary method 1700 of distributing a requested interactive media file to a requesting device, according to an exemplary embodiment. The exemplary method shows steps 1701, 1703, 1705, and 1707, but it should be appreciated that other embodiments may omit one or more steps, or may include additional or alternative steps.

In a first step 1701, a development server may receive a request for an interactive media file and media player from a provider server hosting a webpage or web-application containing an embed code or hyperlink for the interactive media file.

In a next step 1703, the development server may identify which interactive media file the provider server is calling, based on the embed code. In some cases, the development server may store interactive media files in a cache memory or other easily accessible memory, where the development server may quickly identify and transmit the appropriate the interactive media file to the provider server. In some cases, the embed code or the hyperlink media file may direct the development server to a media project record in the project database. The media project record may contain the various files and data that was used to generate the interactive media file; and the media project record may store the interactive media file. So the development server may fetch the interactive media file from the project record based on the embed code or a project identifier for the record indicated by the embed code.

In a next step 1705, the development server may determine whether there are any updates to the underlying files or data of the interactive media file, then the development server may recompile only portions of the interactive development file. In conventional tools, such as Flash®, changes to a Flash® media file would require a designer to recompile an entire Flash® media file on the designer's computer, and then redistribute the latest version of the Flash® media file. However, the development server may distribute the media player and interactive media file without recompilation. That is, because development server may assemble the interactive media file at runtime, the underlying code of the interactive media file may call to the most recent versions of the media file and canvas files, and the media player may call the most recent version of the interactive media file.

In a next step 1707, the development server may transmit the interactive media file and/or media player to the remote device that issued the call for embed code.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A computer-implemented method comprising:
   generating, by a computer, a media layer file comprising programmatic code indicating a storage location of a media file configured to be displayed on a graphical user interface;
   generating, by a computer, a first canvas layer file comprising programmatic code defining a set of one or more coordinates corresponding to the media file and configured as a hypermedia link triggering display of one or more second canvas layers;
   generating, by a computer, a second canvas layer file comprising programmatic code defining a set of one or more coordinates corresponding to the first canvas layer and the media layer file, the set of or more coordinates configured to be a hypermedia link triggering display of a user interface, and the second canvas layer configured to communicate data between an end-user device and a third-party server; and
   assembling, by the computer, an interactive media file distributable in a self-contained manner to other computers based upon the respective programmatic code of the media layer file, the first canvas layer, and the second canvas layer; wherein
   a viewer of the media file when displayed on the graphical user interface can select the hypermedia link by a user action within the graphical user interface associated with the set of one or more coordinates;

the set of one or more coordinates configured to be the hypermedia link are associated with a predetermined portion of visual content within the media file to be displayed on the graphical user interface; and a remote server can transmit and render the media file together with content defined by at least one of the first canvas file and the second canvas file to a user accessing the interactive media file independent of geographic location and time and receive selections of the hypermedia link by the user to trigger display of the user interface associated with the second canvas layer to the user; wherein absent a selection action by the viewer of the media file with respect to a hypermedia link defined by the first canvas layer file the media file is displayed to the viewer independent of displaying the one or more second canvas layers;

absent a selection action by the viewer of the media file with respect to a hypermedia link defined by the second canvas layer file the media file is displayed to the viewer independent of displaying the graphical user interface;

upon a selection action by the viewer of the media file with respect to a hypermedia link defined by the set of one or more coordinates within the first canvas layer file displaying to the viewer the one or more second canvas layers in conjunction with the media file; and upon a selection action by the viewer of the media file with respect to a hypermedia link defined by the set of one or more coordinates within the second canvas layer file displaying to the viewer the graphical user interface in conjunction with the media file.

2. The method according to claim 1, further comprising receiving, by a computer, from a remote server a request containing an embed code identifying the interactive media file, wherein the computer assembles the interactive media file upon receiving the request from the remote server;

the interactive media file contains all the necessary media and other information necessary to display the media file and provide the viewer with the functionalities associated with the hypermedia links;

the computer distributes at least one of the interactive media file and the embed code to one or more other computers via a communications network; and the one or more other computers can play the interactive media file independent of receipt or addition of any other media file.

3. The method according to claim 2, wherein assembling the interactive media file further comprises generating, by the computer, the embed code identifying the interactive media file.

4. The method according to claim 3, further comprising transmitting, by the computer, the interactive media file to the remote server upon assembling the interactive media file.

5. The method according to claim 4, further comprising at least one of:
    transmitting, by the computer, to the remote server at least one machine-readable file, in response to receiving a second request for the at least one machine-readable file triggered from the programmatic code of the interactive media file; and
    transmitting, by the computer, a media player software program configured to execute programmatic code of the interactive media file, communicate data with the computer according to the programmatic code of the interactive media, and communicate data with the third-party computer according to the programmatic code of the second canvas layer file.

6. The method according to claim 1, wherein the programmatic code of the media layer file at least one of:
    indicates that the storage location of the media file of the media layer is hosted at a second remote server; and
    indicates that the media file of the media layer is stored in the media project record.

7. The method according to claim 1, further comprising storing, by the computer, into a media project record of a project database, at least one of the media layer file, the first canvas layer file, and the second canvas layer file.

8. The method according to claim 1, further comprising generating, by the computer, programmatic code of the second canvas layer containing at least one hypermedia link configured to execute a second software application within the interactive media file.

9. A system comprising:
a development server comprising:
    a processor hosting a development application configured to generate a media layer file, a first canvas file, and a second canvas file according to one or more inputs received from a designer device, the development server further configured to assemble an interactive media file based upon the media layer file, the first canvas file, and the second canvas file, and transmit the interactive media file to one or more remote servers; and
a remote server comprising:
    a processor hosting a media player configured to execute the interactive media file, the remote server configured to request the interactive media file from the development server; wherein the first canvas file comprises programmatic code defining a set of one or more coordinates corresponding to the media layer file and containing a hypermedia link triggering display of one or more second canvas layers;

a viewer of the interactive media file when displayed on the graphical user interface can select the hypermedia link by a user action within the graphical user interface associated with the set of one or more coordinates;

the set of one or more coordinates configured to be the hypermedia link are associated with a predetermined portion of visual content within a media file from which the media layer file is generated; and a remote server can transmit and render the media file together with content defined by at least one of the first canvas file and the second canvas file to a user accessing the interactive media file independent of geographic location and time and receive selections of the hypermedia link by the user to trigger display of the user interface associated with the second canvas layer to the user; wherein absent a selection action by the viewer of the media file with respect to a hypermedia link defined by the first canvas layer file the media file is displayed to the viewer independent of displaying the one or more second canvas layers;

absent a selection action by the viewer of the media file with respect to a hypermedia link defined by the second canvas layer file the media file is displayed to the viewer independent of displaying the graphical user interface;

upon a selection action by the viewer of the media file with respect to a hypermedia link defined by the set of one or more coordinates within the first canvas layer file displaying to the viewer the one or more second canvas layers in conjunction with the media file; and upon a selection action by the viewer of the media file with respect to a hypermedia link defined by the set of one or more coordinates within the second canvas layer file displaying to the viewer the graphical user interface in conjunction with the media file.

10. The system according to claim 9, wherein
the media layer file comprises programmatic code containing a machine-readable pointer to the media file of the media layer file.

11. The system according to claim 10, wherein
the media player executed by the remote server instructs the remote server to retrieve the media file from a second remote server hosting one or more media files.

12. The system according to claim 9, wherein the media player executed by the remote server instructs the remote server to communicate data with the development server according to the programmatic code of the first canvas file triggered by an end-user device selecting the set of one or more coordinates.

13. The system according to claim 9, wherein
the second canvas layer is at least one of:
comprises programmatic code defining a set of one or more coordinates corresponding to the first canvas layer and the media layer, the set of coordinates configured to be a hypermedia link triggering display of a user interface within the interactive media file; and
configured to communicate data between an end-user device and a second remote server hosting a second computing service.

14. The system according to claim 9, wherein
the development server is further configured to generate each respective layer file according to one or more inputs received from a designer computing device.

15. The system according to claim 9, further comprising
a project database comprising non-transitory machine-readable storage media configured to one or more media records, each respective record containing at least one of the media layer file, the first canvas file, and the second canvas file.

16. The system according to claim 9, wherein
the development server is further configured to store the media layer file and a plurality of canvas files into a media project record and assemble the interactive media file according to the media project record as requested from the remote server.

17. The method according to claim 1, wherein
the first canvas layer file when rendered upon the graphical user interface displays a visual element over the media file, the visual element defined by the set of one or more coordinates which are configured as the hypermedia link triggering display of one or more second canvas layers and indicating the presence of the hypermedia link.

18. The method according to claim 1, wherein
the media file is a self-contained file relating to an item of audio-visual content which can be rendered and viewed by the user with and without the interactive media file.

19. The method according to claim 1, wherein
rendering of the content defined by at least one of the first canvas file and the second canvas file to a user accessing the interactive media file upon the user performing the action within the graphical user interface associated with the set of one or more coordinates is made upon completion of rendering an item of audiovisual content associated with the media file.

20. The method according to claim 1, wherein
the interactive media file is self-contained and may be distributed to and executed upon remote electronic devices.

21. The system according to claim 9, wherein
the interactive media file is distributable in a self-contained manner to other computers based upon the respective programmatic code of the media layer file, the first canvas layer, and the second canvas layer; wherein
when rendered upon the other computers the user views the same media file and upon triggering one or more of the hyperlinks is provided the same information independent of a geographical location and time at which the user views the media file.

22. The system according to claim 9, wherein
the interactive media file when accessed by a user renders only the media file absent any selection of a hyperlink by the user; and
either:
no visual indication of a location associated with a hyperlink defined by either the first canvas layer or the second canvas layer is provided to the user;
or
a common visual icon is displayed as a visual indication to the user of each location associated with a hyperlink defined by either the first canvas layer or the second canvas layer.

23. The method according to claim 1, wherein
the interactive media file when accessed by a user renders only the media file absent any selection of a hyperlink by the user; and
either:
no visual indication of a location associated with a hyperlink defined by either the first canvas layer or the second canvas layer is provided to the user;
or
a common visual icon is displayed as a visual indication to the user of each location associated with a hyperlink defined by either the first canvas layer or the second canvas layer.

* * * * *